US008685352B2

(12) United States Patent
Golden et al.

(10) Patent No.: US 8,685,352 B2
(45) Date of Patent: Apr. 1, 2014

(54) ZERO PLATINUM GROUP METAL CATALYSTS

(75) Inventors: Stephen J. Golden, Santa Barbara, CA (US); Randal Hatfield, Oxnard, CA (US); Jason Pless, Ventura, CA (US); Johnny Ngo, Oxnard, CA (US); Mann Sakbodin, Thousand Oaks, CA (US)

(73) Assignees: ECS Holdings, Inc., Ventura, CA (US); Catalytic Solutions, Inc., Ventura, CA (US)

( * ) Notice: Subject to any disclaimer, the term of this patent is extended or adjusted under 35 U.S.C. 154(b) by 166 days.

(21) Appl. No.: 12/791,699

(22) Filed: Jun. 1, 2010

(65) Prior Publication Data
US 2010/0240525 A1    Sep. 23, 2010

Related U.S. Application Data

(63) Continuation of application No. 12/215,694, filed on Jun. 27, 2008.

(51) Int. Cl.
*B01D 53/72* (2006.01)
*B01D 53/56* (2006.01)
*B01D 53/62* (2006.01)

(52) U.S. Cl.
USPC .............. 423/213.2; 423/213.5; 423/245.1

(58) Field of Classification Search
USPC .................... 423/213.2, 213.5, 245.1
See application file for complete search history.

(56) References Cited

U.S. PATENT DOCUMENTS

| 3,473,987 | A | * | 10/1969 | Sowards | ................... | 156/89.22 |
| 5,175,132 | A | * | 12/1992 | Ketcham et al. | ............ | 501/103 |
| 5,182,249 | A | * | 1/1993 | Wang et al. | ................... | 502/303 |
| 5,965,099 | A | * | 10/1999 | Hartweg et al. | ............ | 423/213.5 |
| 6,372,686 | B1 | * | 4/2002 | Golden | ........................ | 502/302 |
| 2003/0221360 | A1 | * | 12/2003 | Brown et al. | ................... | 44/301 |
| 2005/0207956 | A1 | * | 9/2005 | Vierheilig | .................. | 423/213.2 |
| 2005/0227867 | A1 | * | 10/2005 | Chen et al. | .................... | 502/325 |
| 2006/0100097 | A1 | * | 5/2006 | Chigapov et al. | ............ | 502/304 |
| 2006/0223694 | A1 | * | 10/2006 | Gandhi et al. | ................. | 502/60 |
| 2006/0228283 | A1 | * | 10/2006 | Malyala et al. | ............ | 423/239.1 |

FOREIGN PATENT DOCUMENTS

EP    541271 A1 *  5/1993

OTHER PUBLICATIONS

Jeong Kwon Suh et al., "Characterization of transition metal-impregnated La-Al complex oxides for catalytic combustion", (1995), Microporous Materials, 3, p. 657-664.*

(Continued)

*Primary Examiner* — Wayne Langel
*Assistant Examiner* — Syed Iqbal
(74) *Attorney, Agent, or Firm* — Thaddius J. Carvis

(57) ABSTRACT

The present invention pertains to catalyst systems for nitrogen oxide, carbon monoxide, hydrocarbon, and sulfur reactions that are free or substantially free of platinum group metals. The catalyst system of the present invention comprise a substrate and a washcoat, wherein the washcoat comprises at least one oxide solid, wherein the oxide solid comprises one or more selected from the group consisting of a carrier material oxide, a catalyst, and mixtures thereof. The catalyst system may optionally have an overcoat, wherein the overcoat comprises at least one oxide solid, wherein the oxide solid comprises one or more selected from the group consisting of a carrier material oxide, a catalyst, and mixtures thereof. The catalyst comprises one or more selected from the group consisting of a ZPGM transition metal catalyst, a mixed metal oxide catalyst, a zeolite catalysts, or mixtures thereof.

7 Claims, 37 Drawing Sheets

(56) References Cited

OTHER PUBLICATIONS

Hong He et al., "An investigation of NO/CO reaction over perovskite-type oxide La0.8Ce0.2B0.4Mn0.6O3 (B= Cu or Ag) catalysts synthesized by reverse microemulsion" (2007), Catalysis Today, 126, p. 290-295.*

Stefano Alini et al., "Development of new catalysts for N2O-decomposition from adipic acid plant" (2007), Applied Catalysis B: Environmental, 70, p. 323-329.*

* cited by examiner

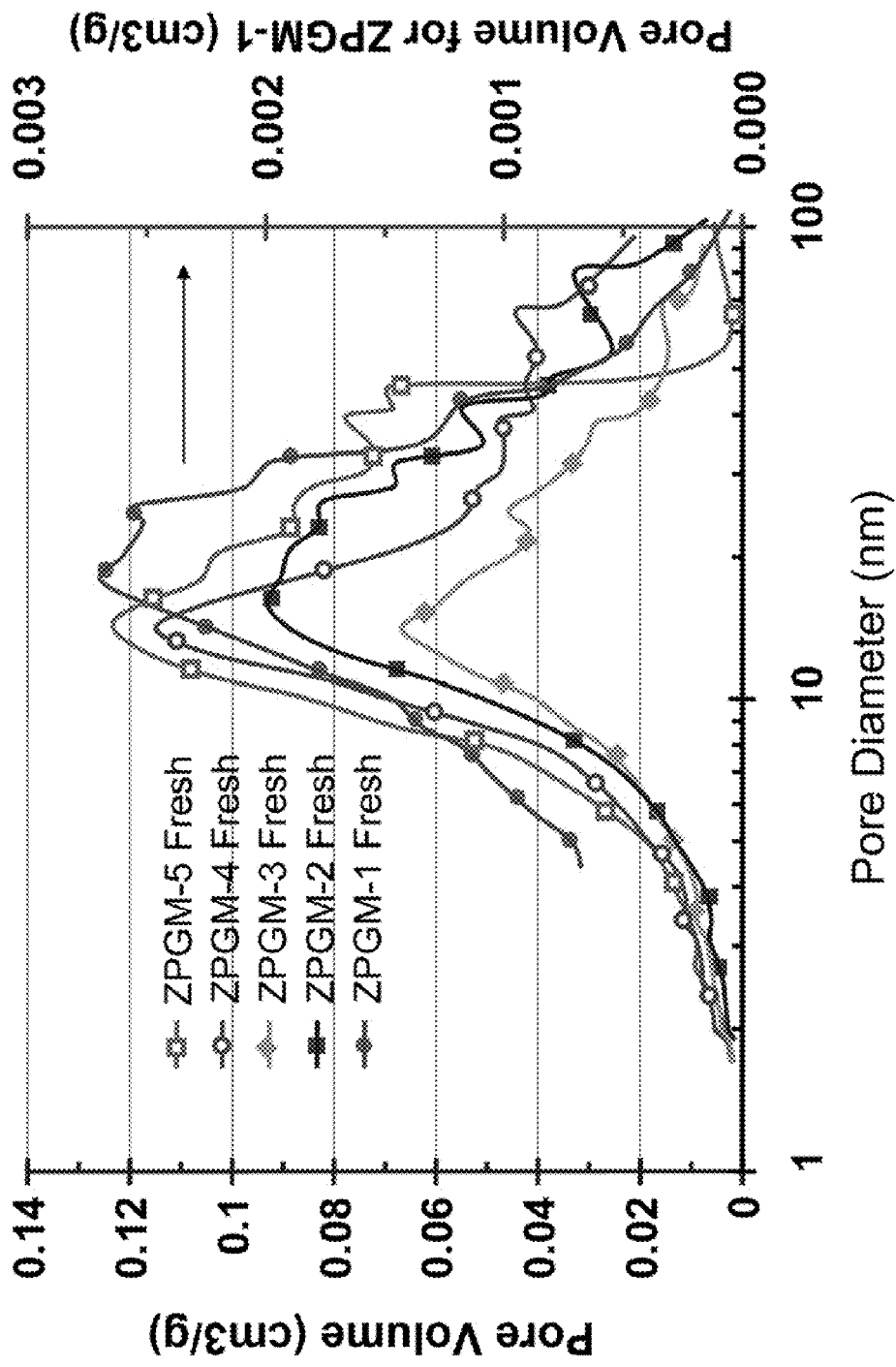
Figure 4. Pore Volumes of Fresh Catalysts

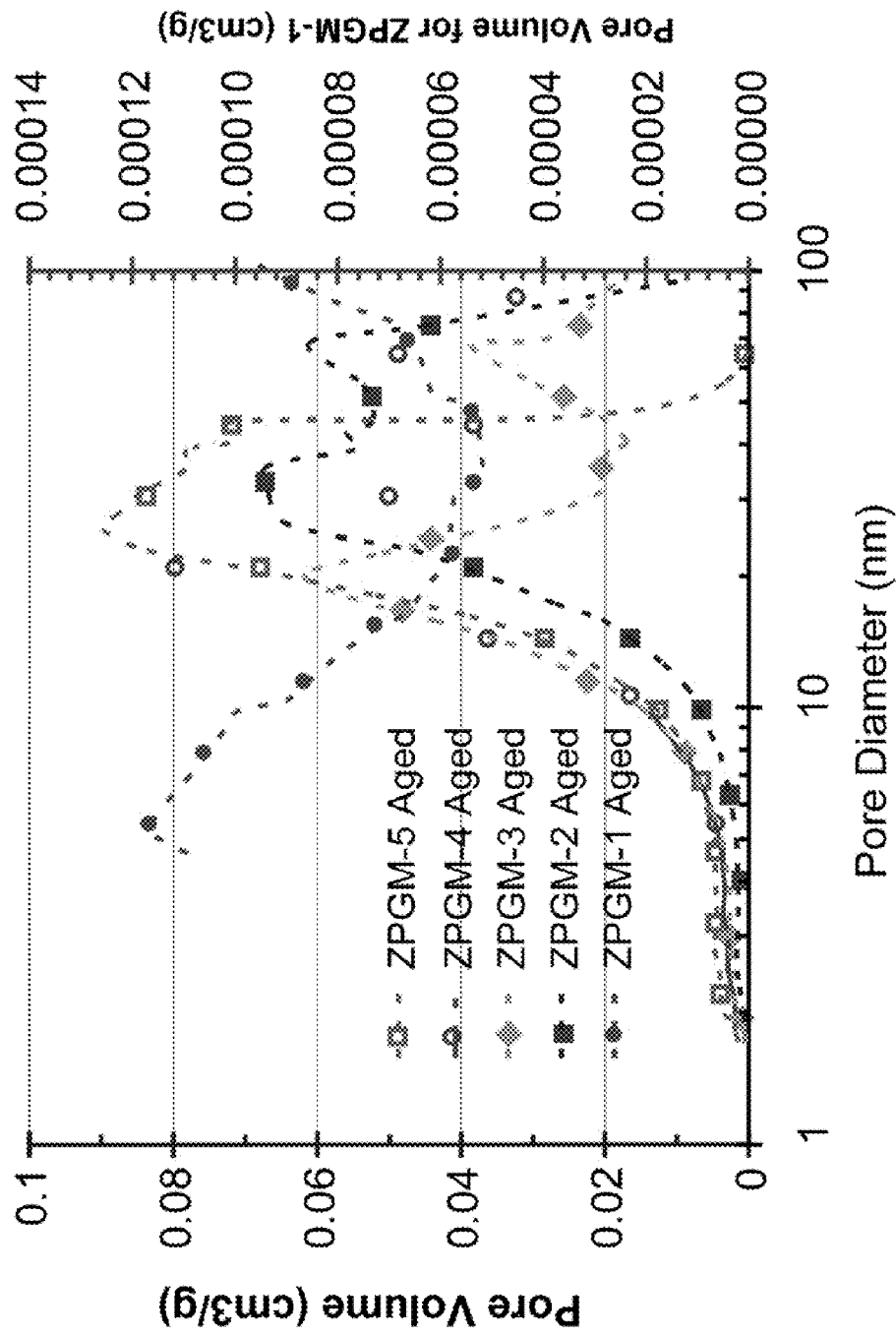
Figure 5. Pore Volumes of Hydrothermally Aged Catalysts (950C/16hr)

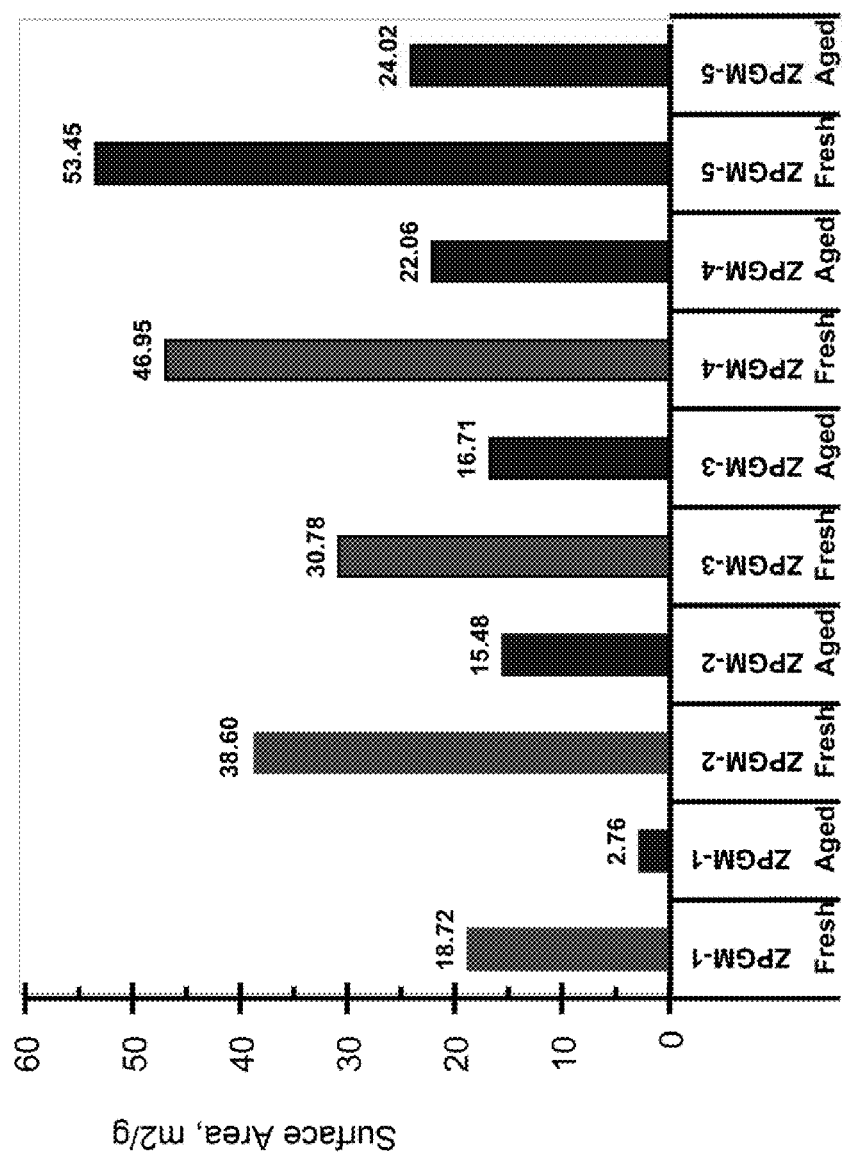
Figure 6. Surface Area Summary for Fresh and Hydrothermally Aged (950C/16Hrs) ZPGM Catalyst Systems

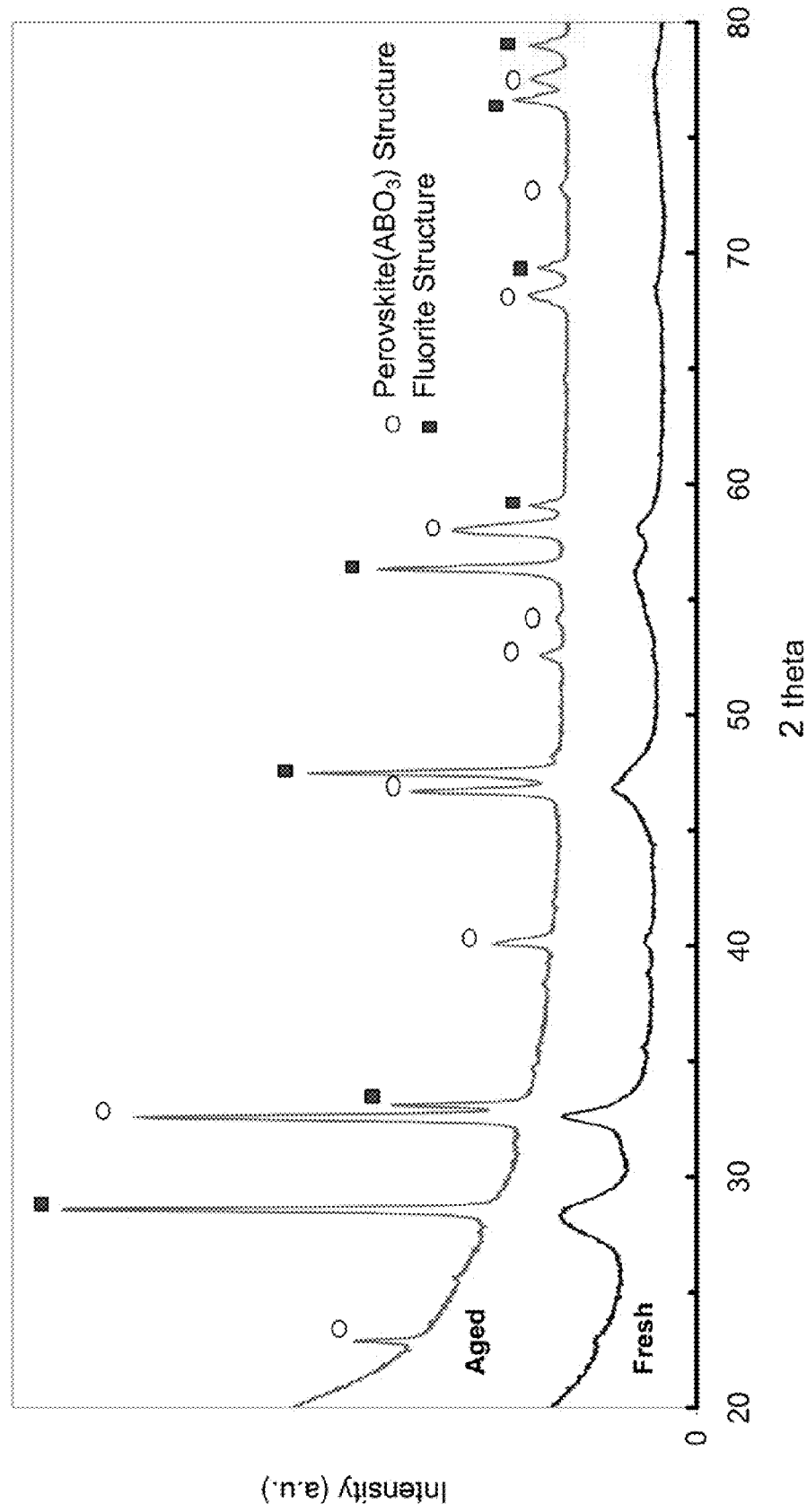

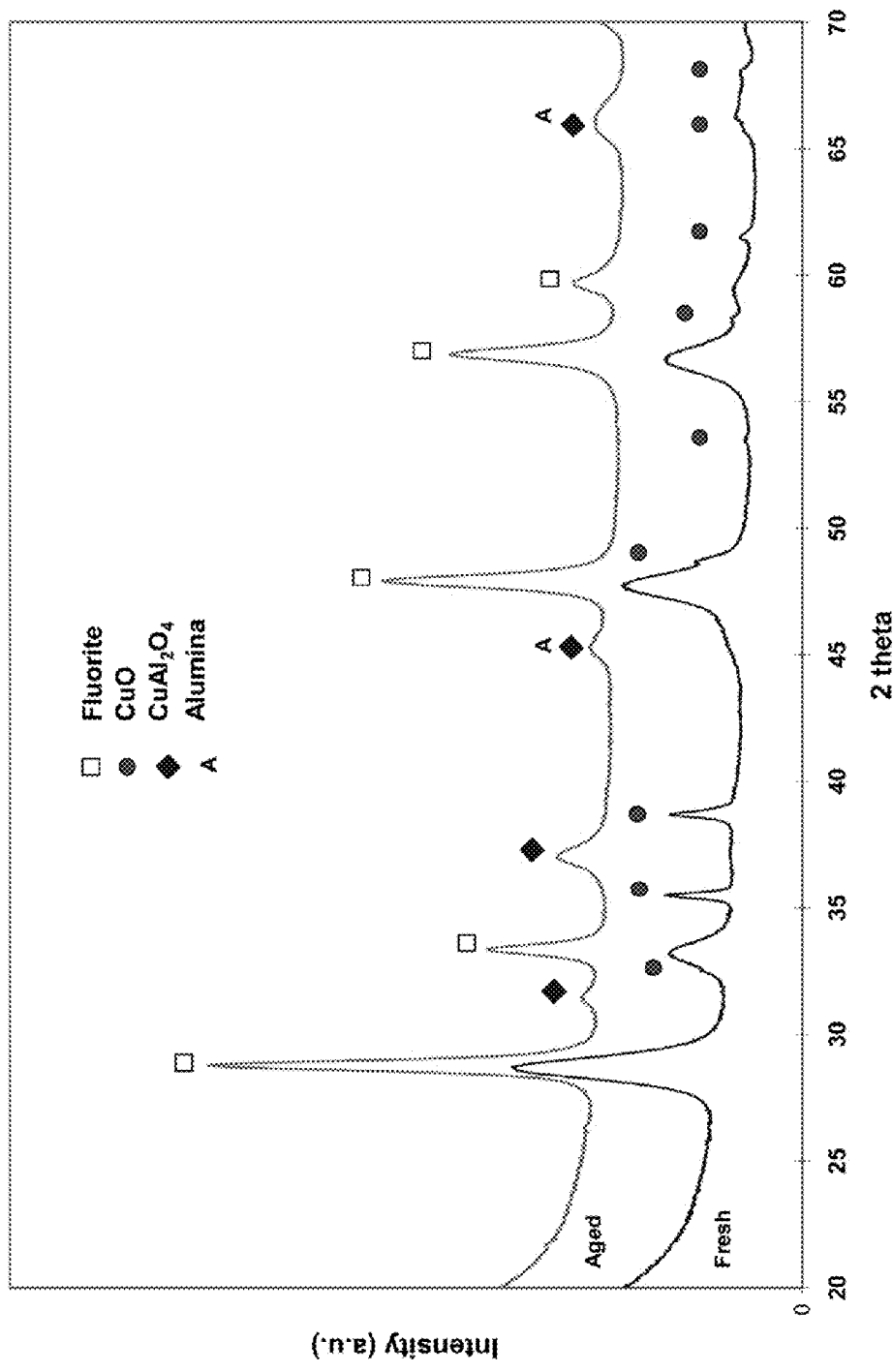

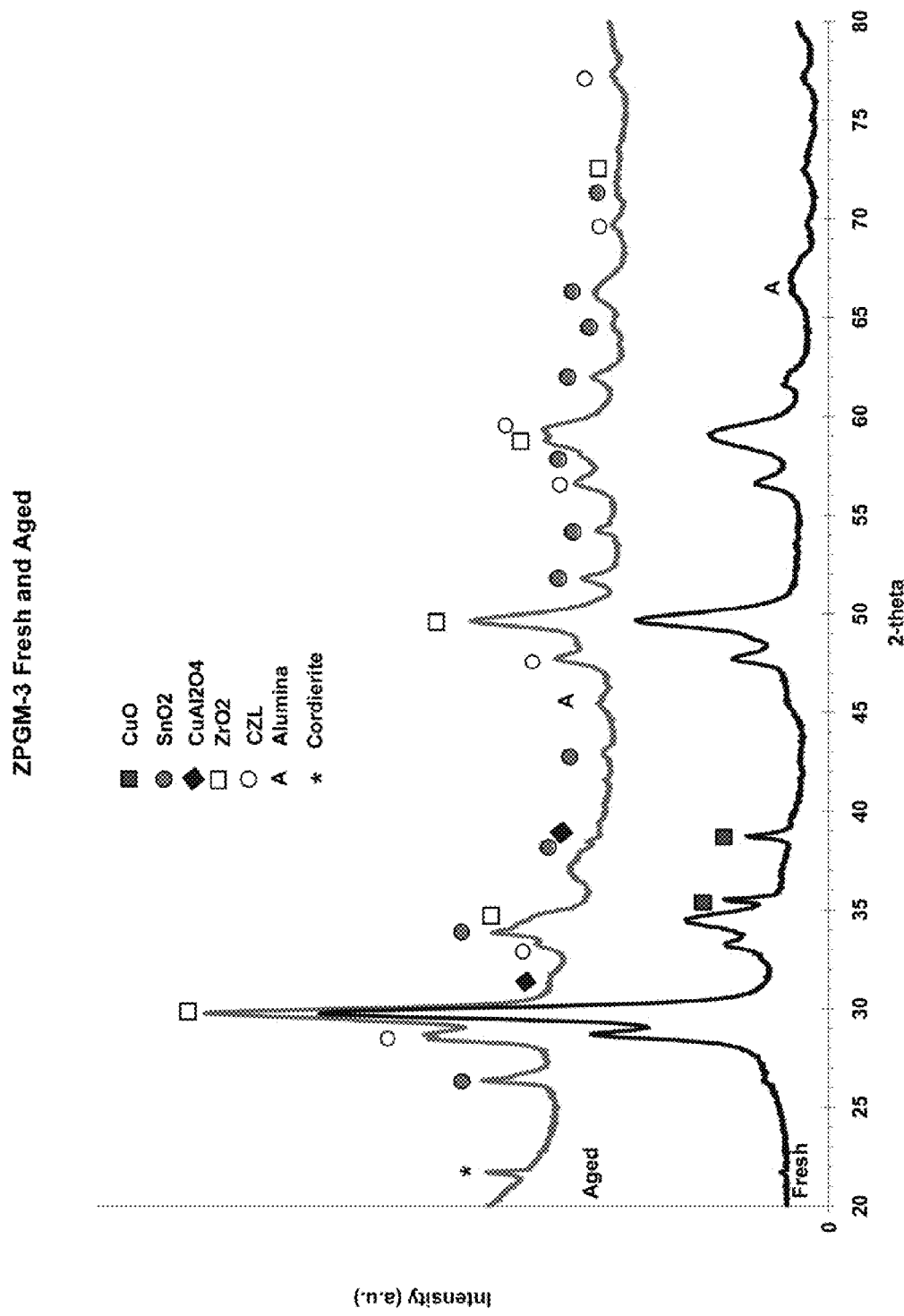
Figure 9. X-ray Diffraction Analysis of ZPGM-3

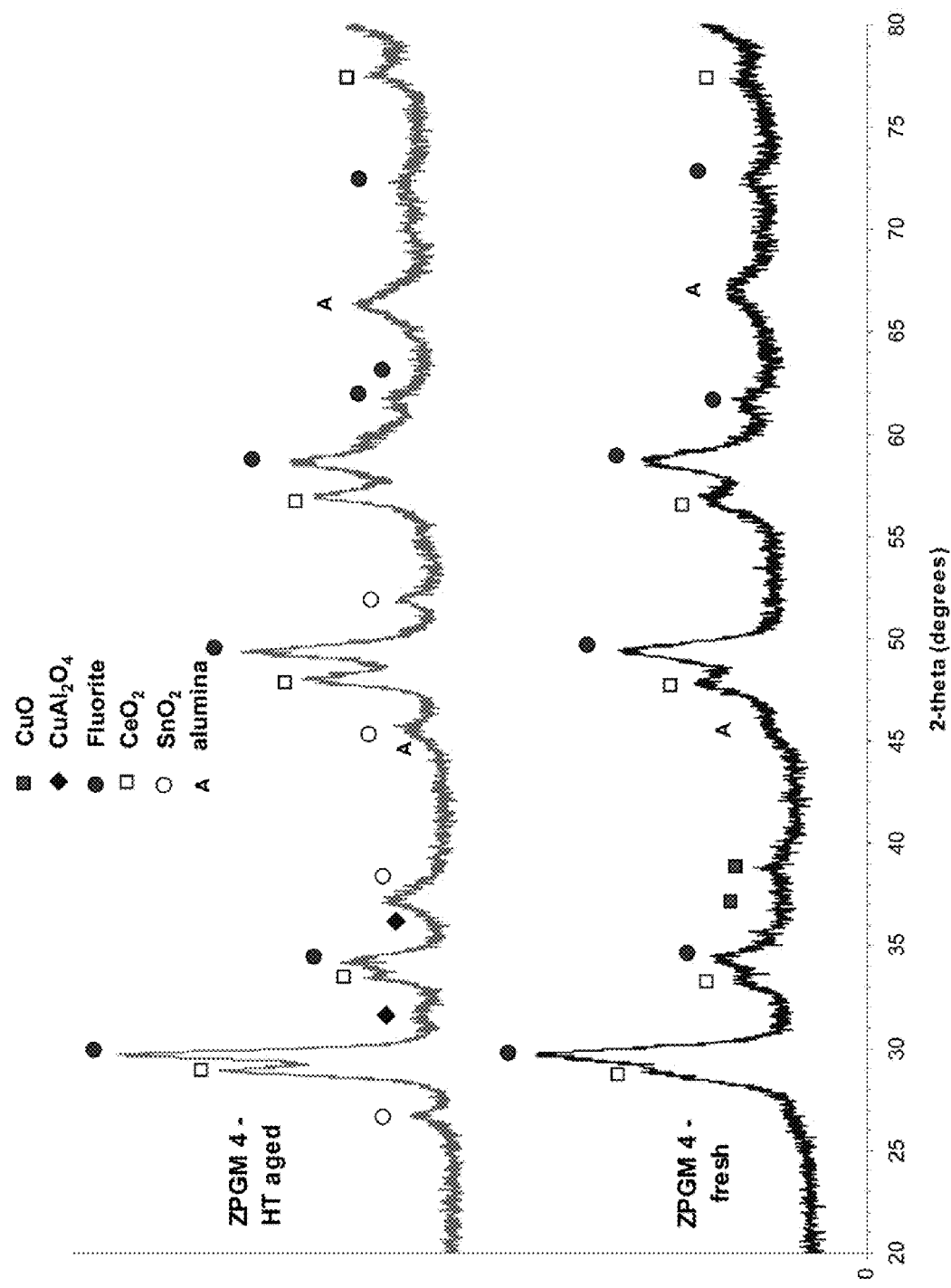

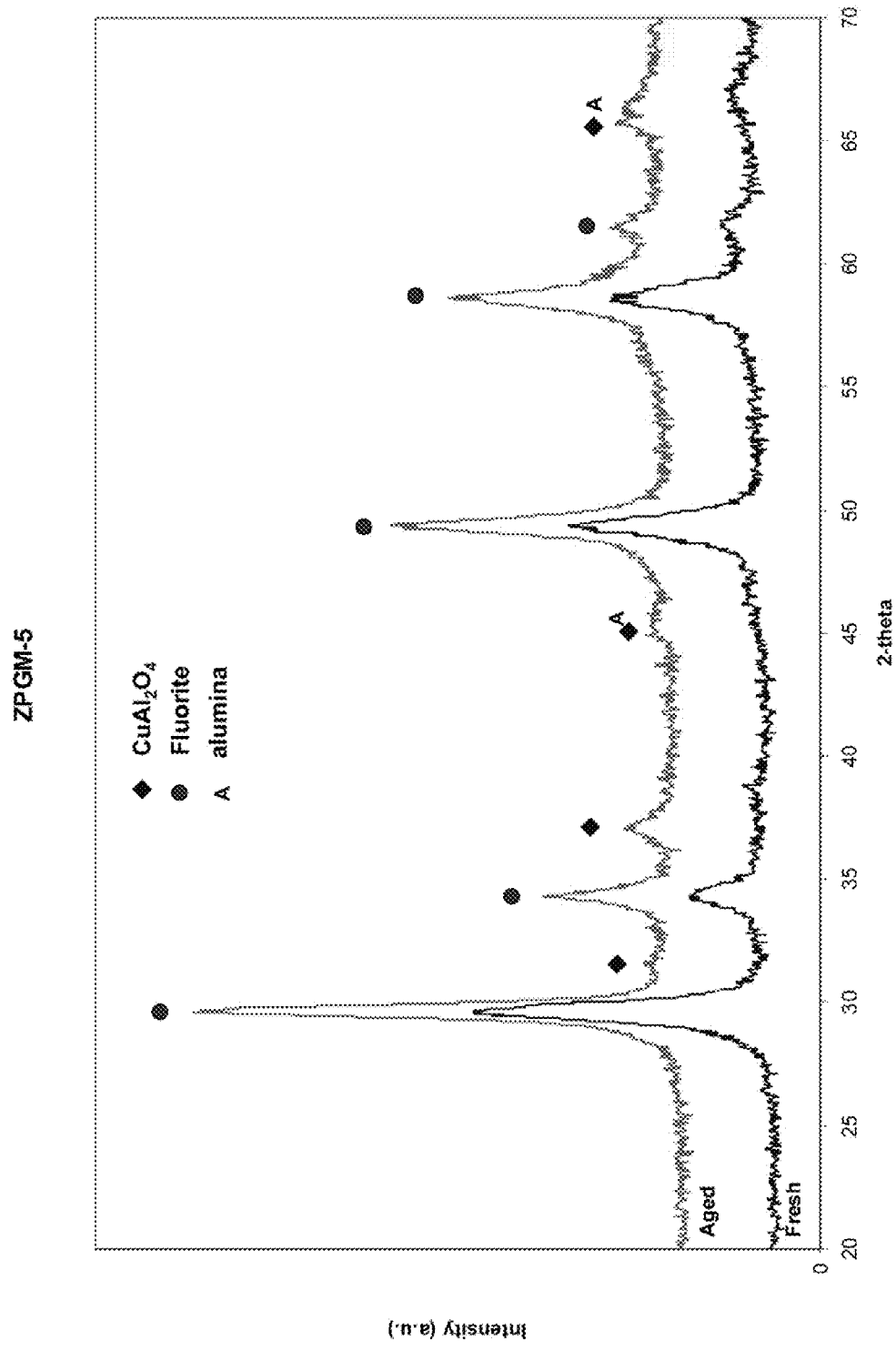
Figure 11. X-ray Diffraction Analysis of ZPGM-5

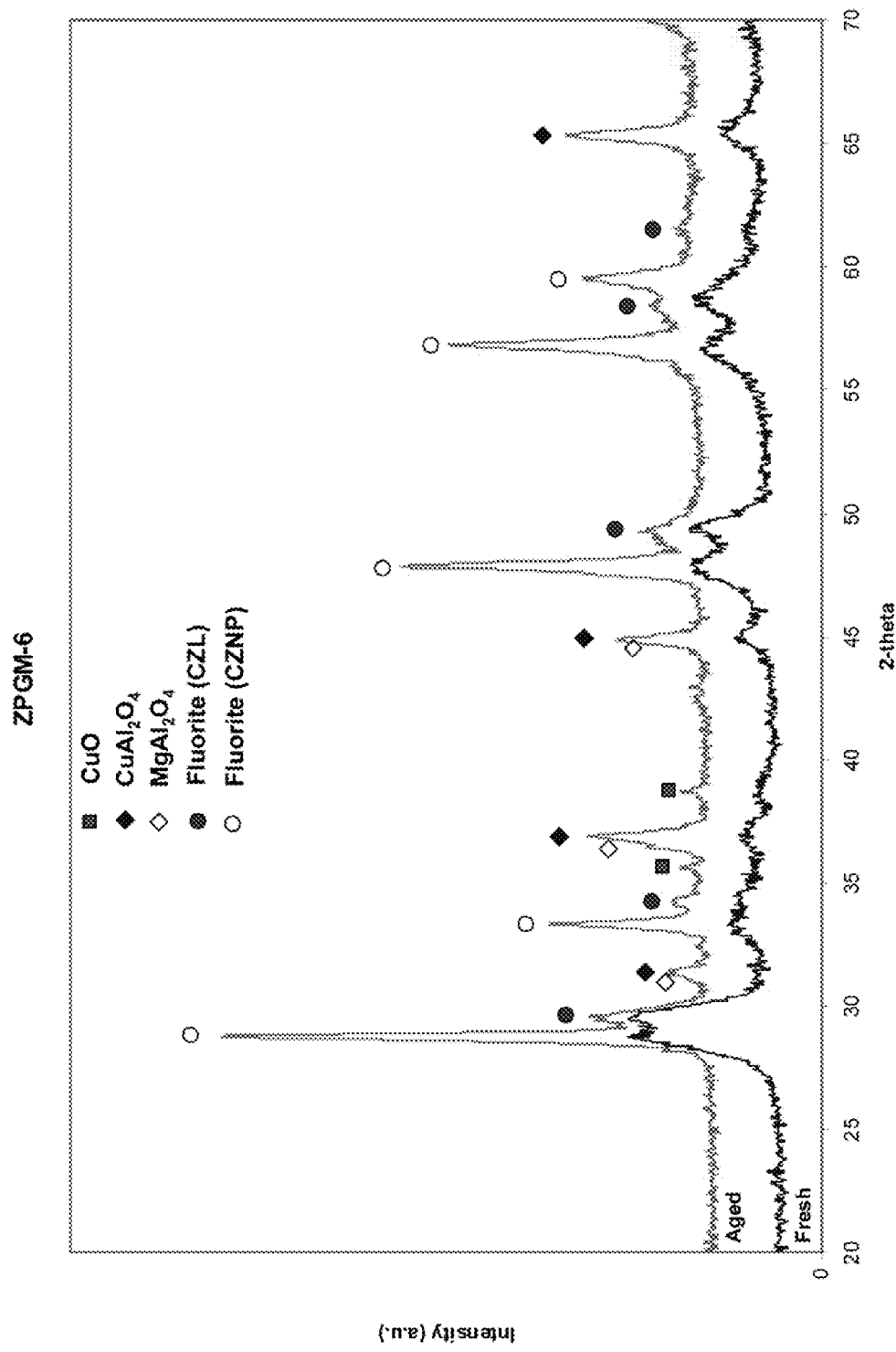

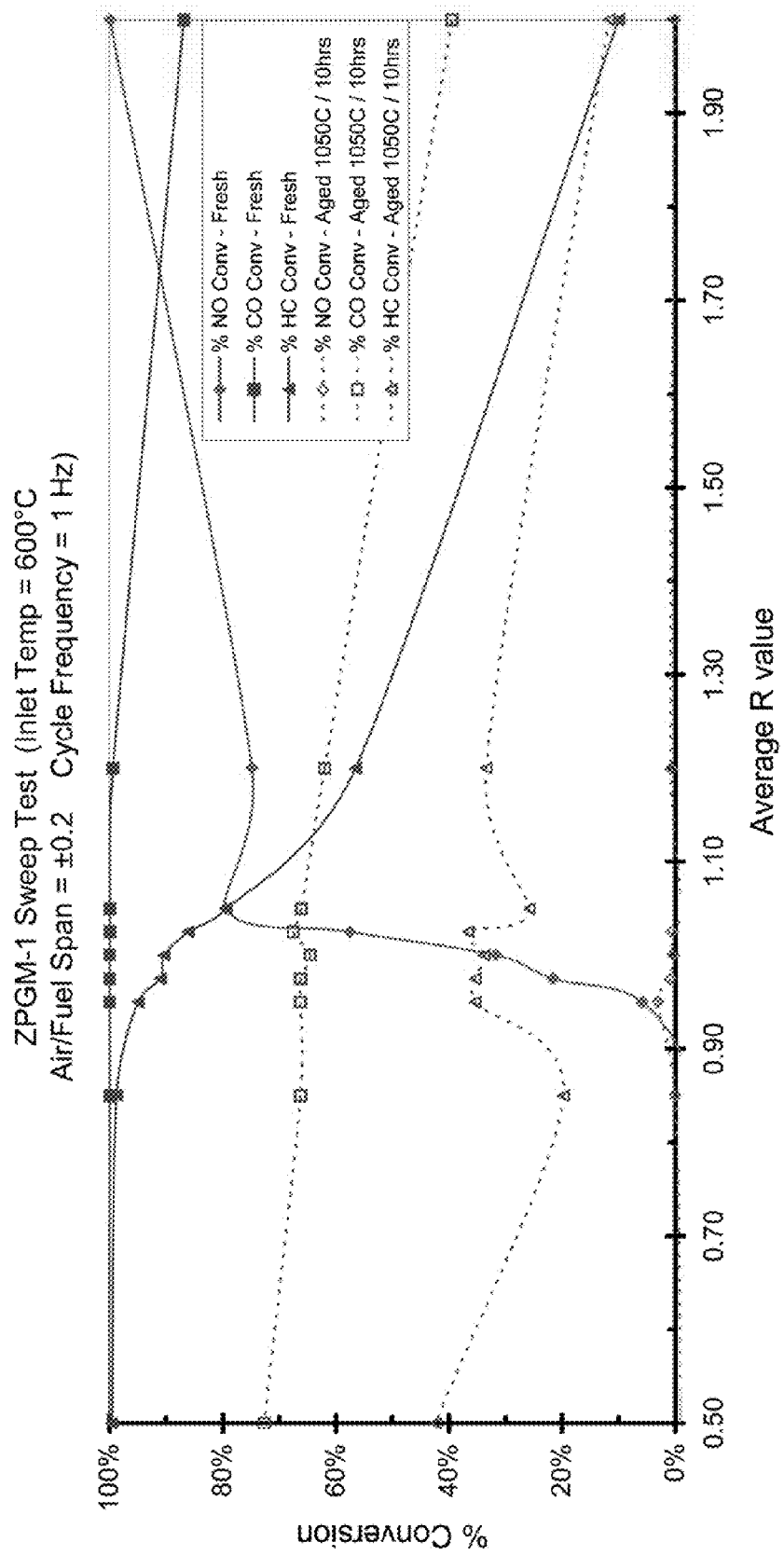
Figure 13. ZPGM-1 Sweep Results for Fresh and Aged (1050C / 10h) Catalyst

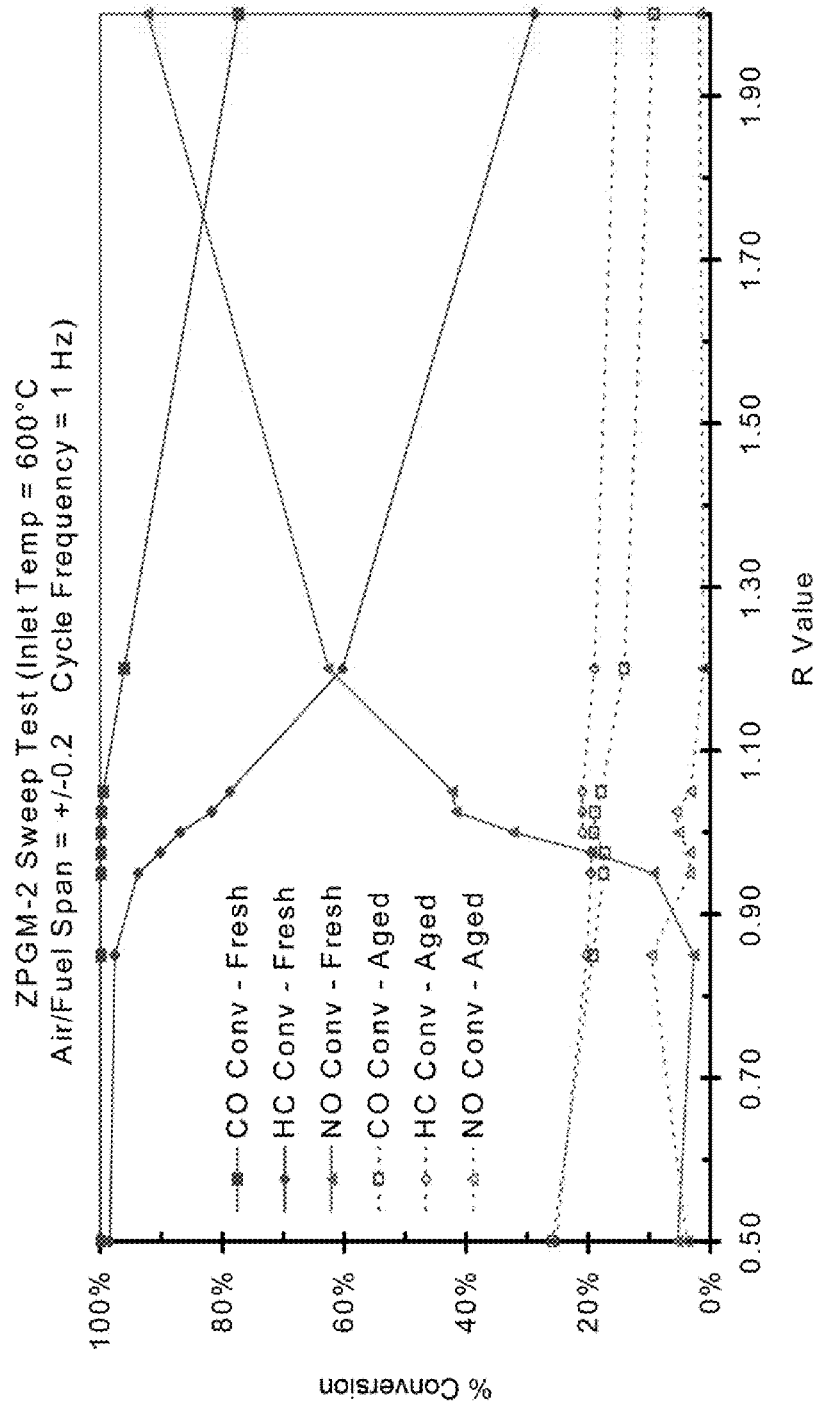
Figure 14. ZPGM-2 Sweep Results for Fresh and Aged (1050C / 10h) Catalyst

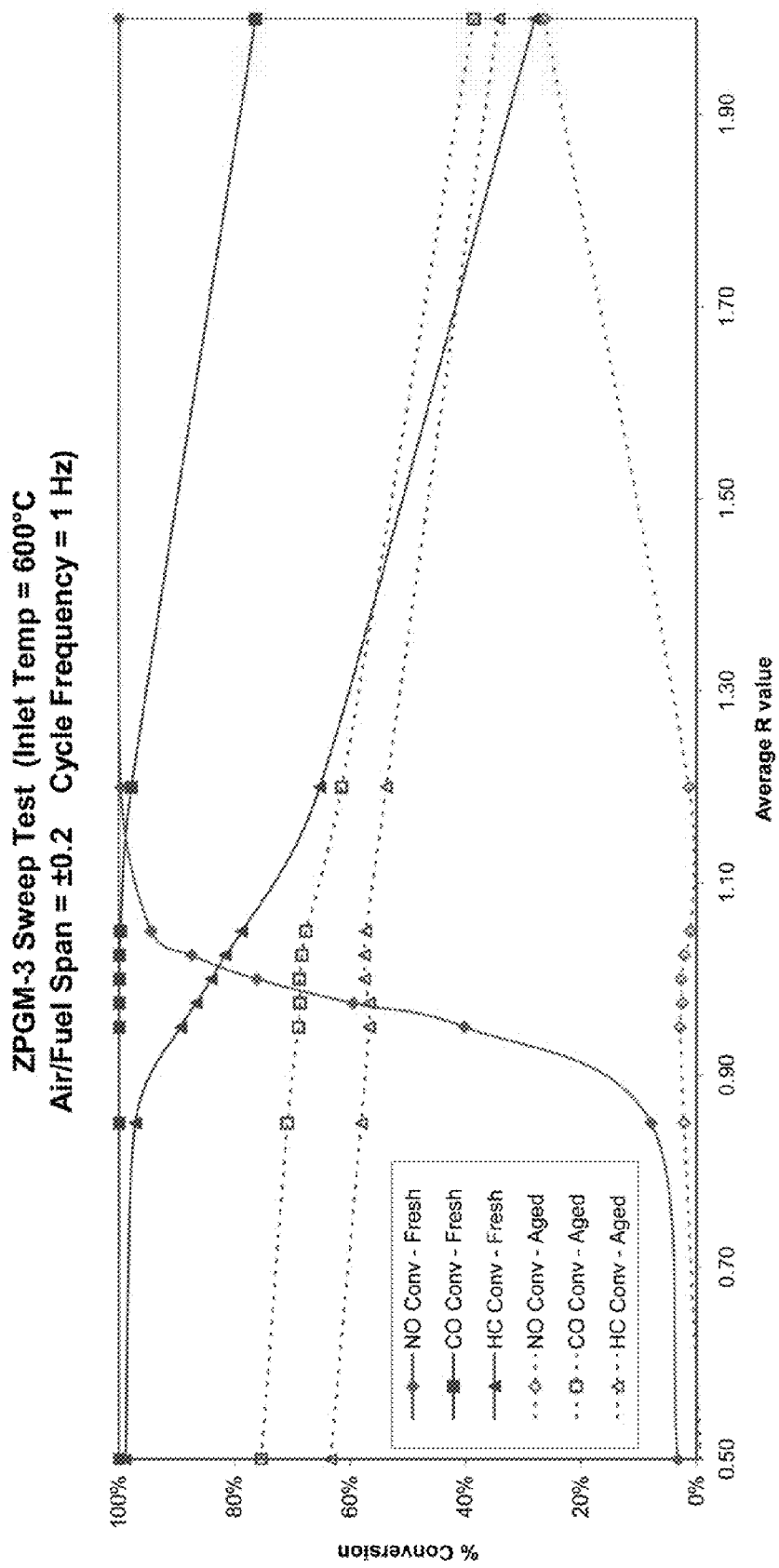
Figure 15. ZPGM-3 Sweep Results for Fresh and Aged (1050C / 10h) Catalyst

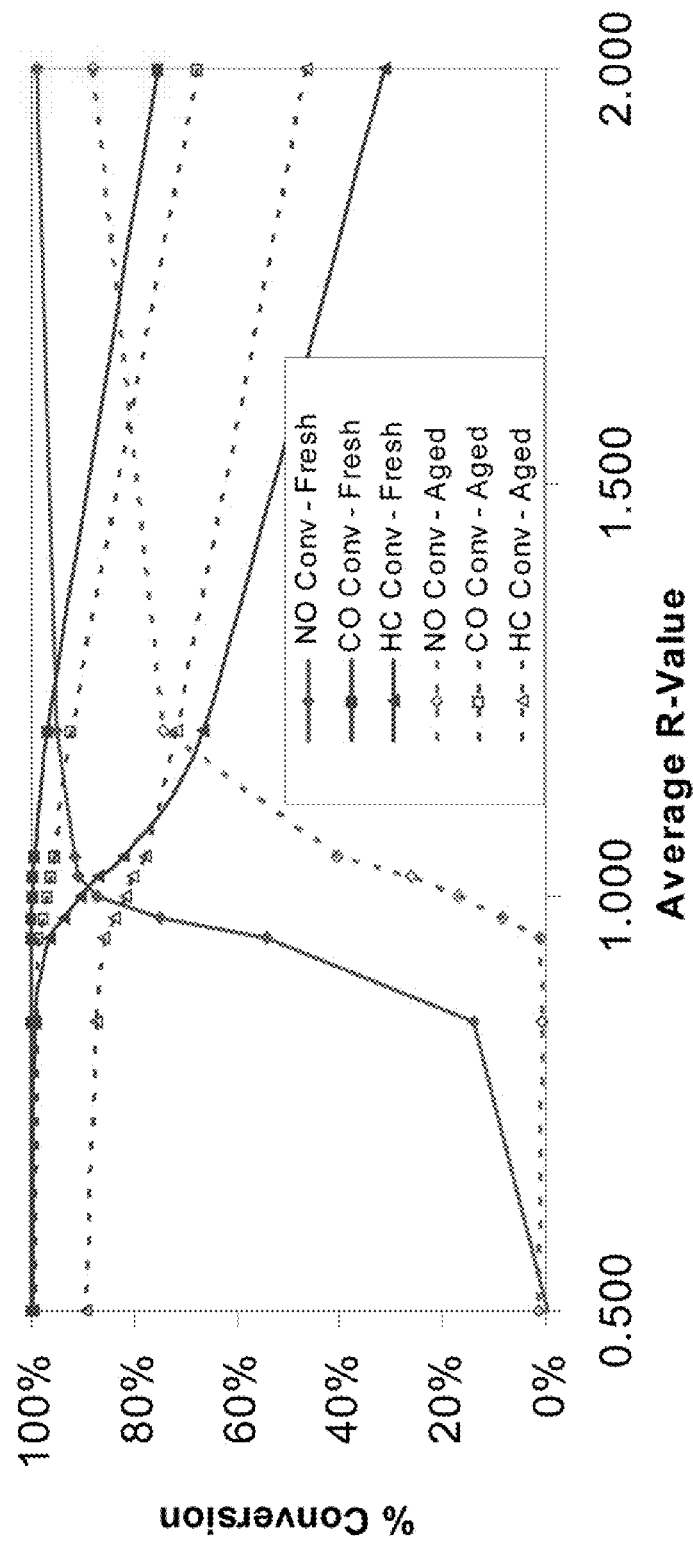
Figure 16. ZPGM-4 Sweep Results for Fresh and Aged (1050C / 10h) Catalyst

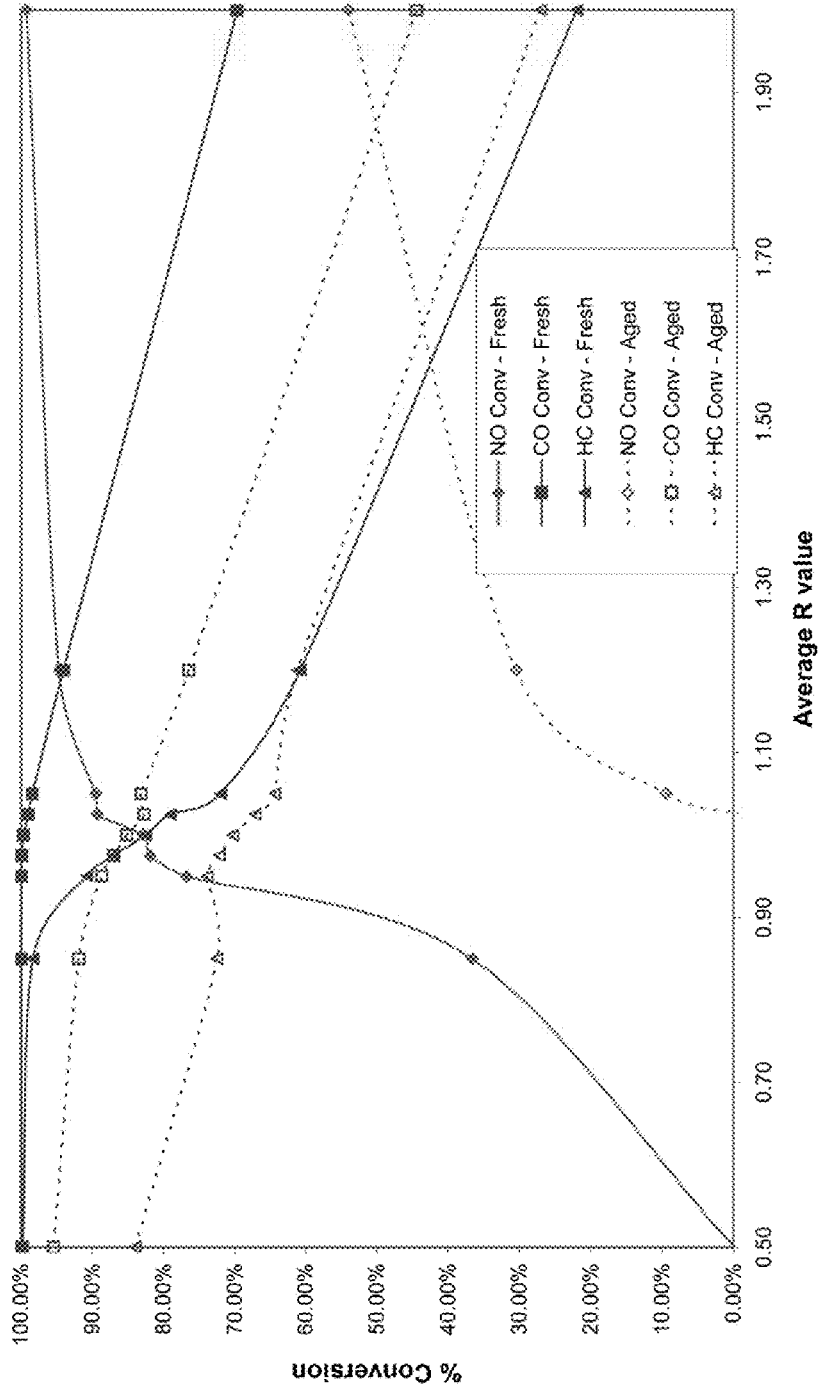
Figure 17. ZPGM-5 Sweep Results for Fresh and Aged (1050C / 10h) Catalyst

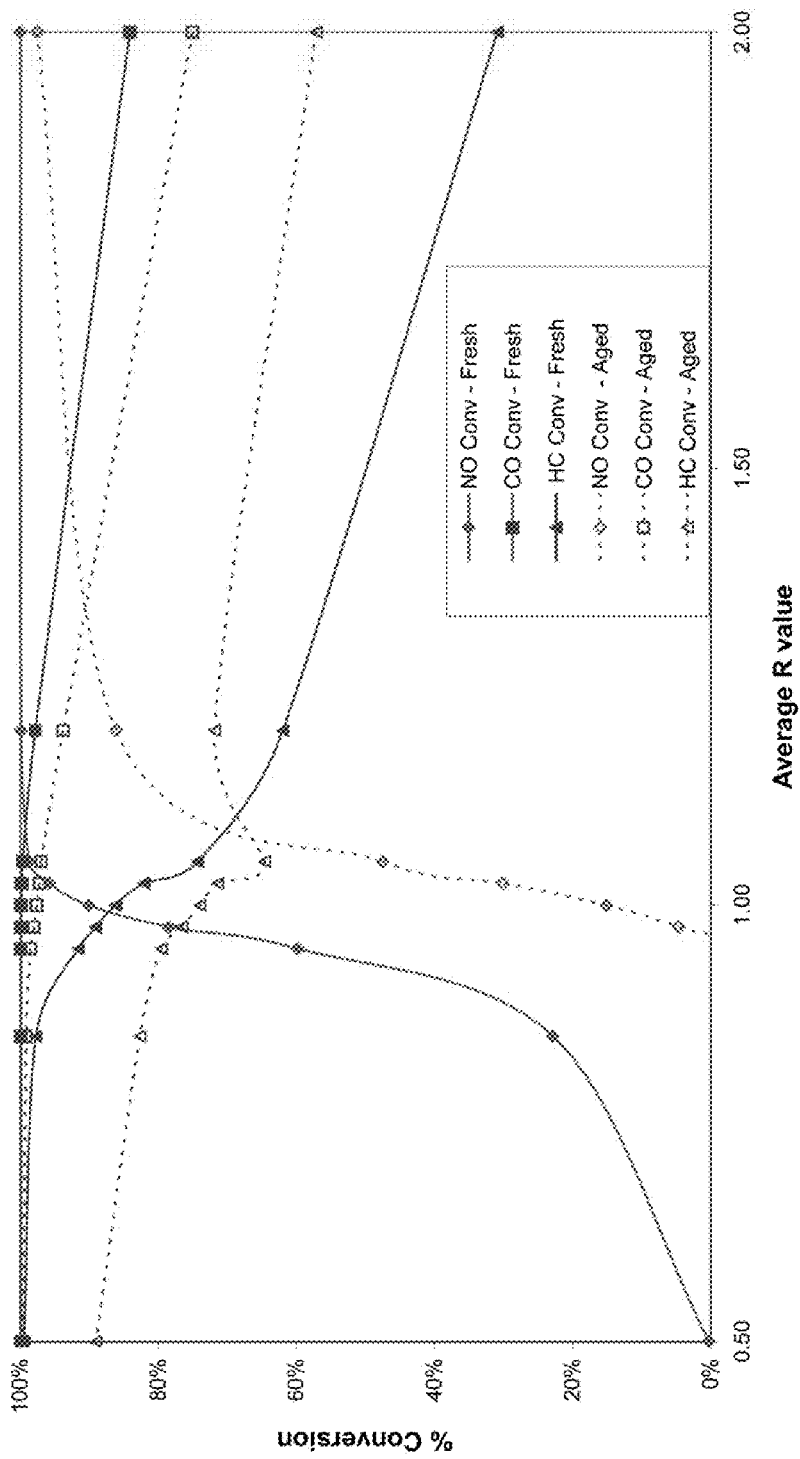
Figure 18. ZPGM-6 Sweep Results for Fresh and Aged (1050C / 10h) Catalyst

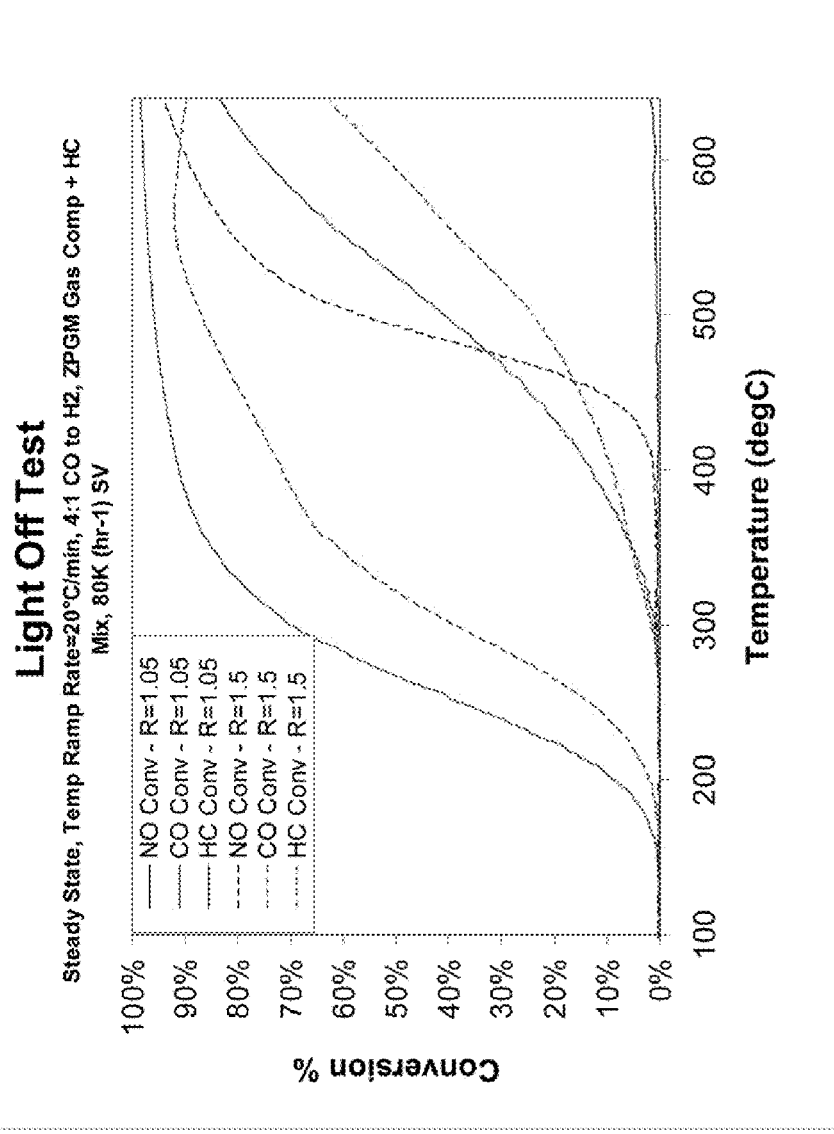
Figure 19. Light-off at R = 1.05 and R = 1.5 for Aged (800C / 16h) Type D Catalyst: 16% Cu / $Ce_{0.3}Zr_{0.6}Nd_{0.05}Pr_{0.05}O_2$

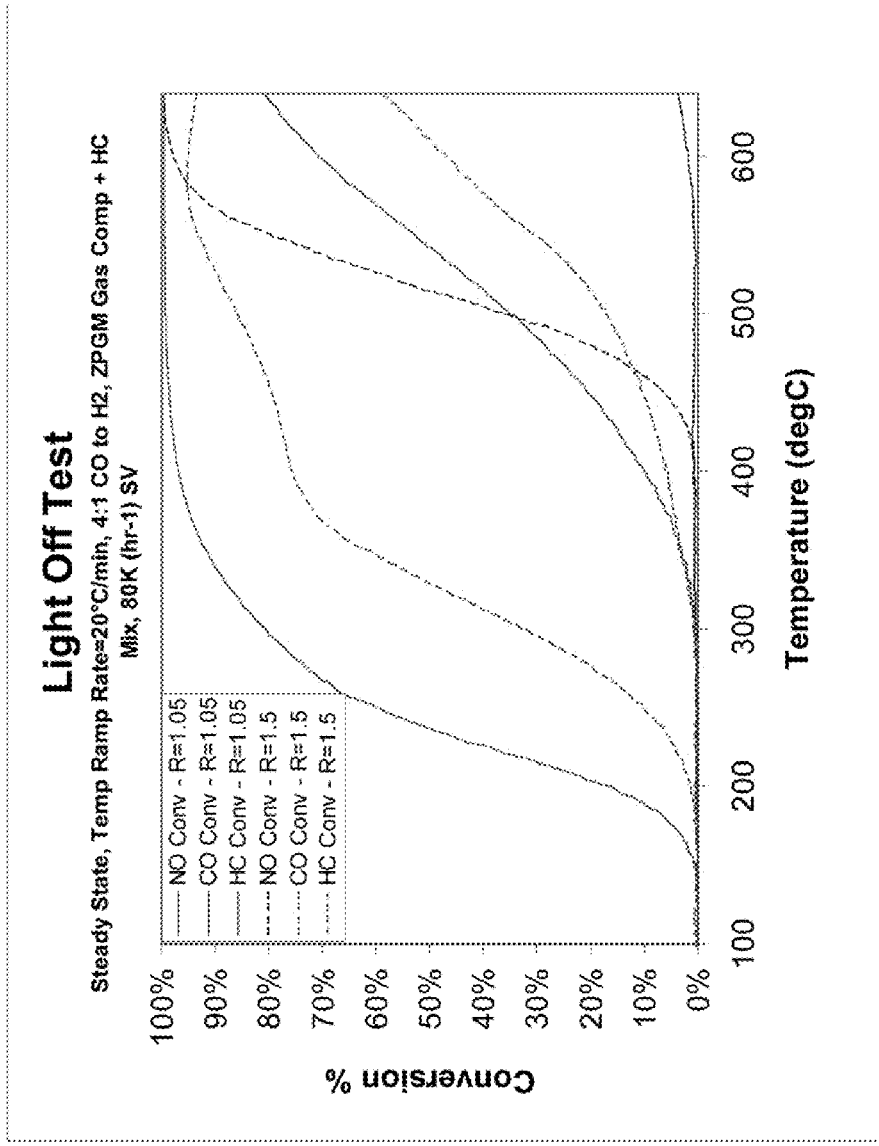
Figure 20. Light-off at R = 1.05 and R =1.5 for Aged (800C / 16h) Type D/H Catalyst: 12% Cu / $Ce_{0.6}Zr_{0.3}La_{0.1}O_2$

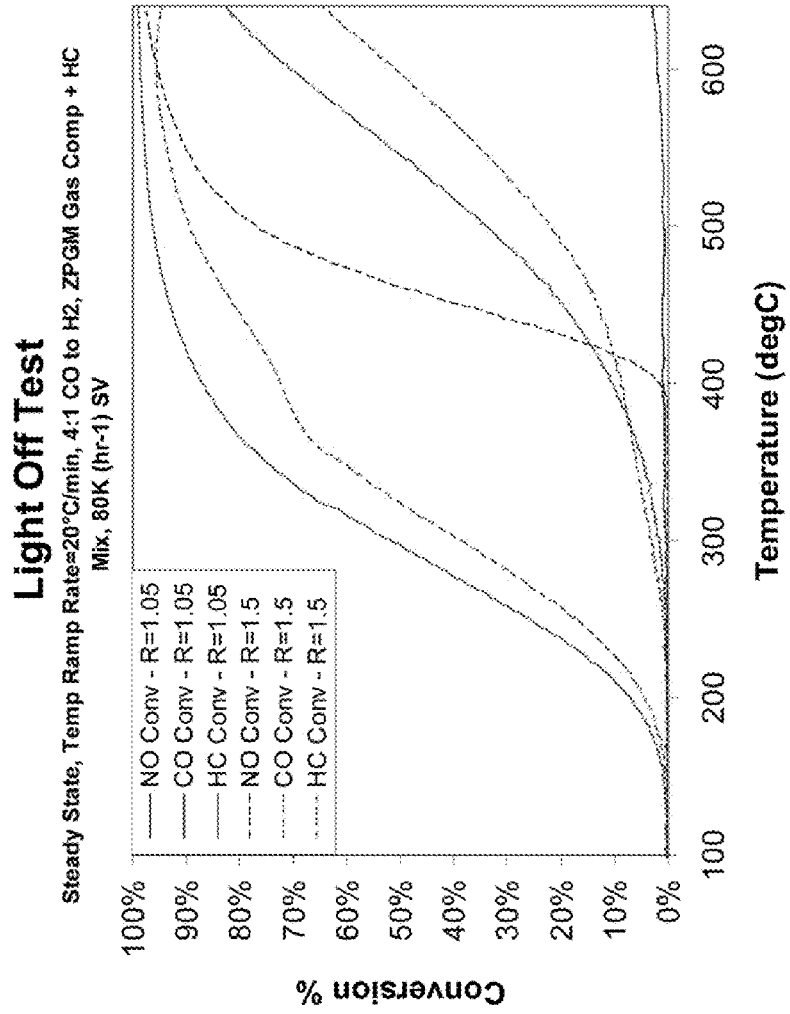
Figure 21. Light-off at R = 1.05 and R =1.5 for Aged (800C / 16h) Type D/H Catalyst: 10% Cu + 12% Ce / La-Al$_2$O$_3$

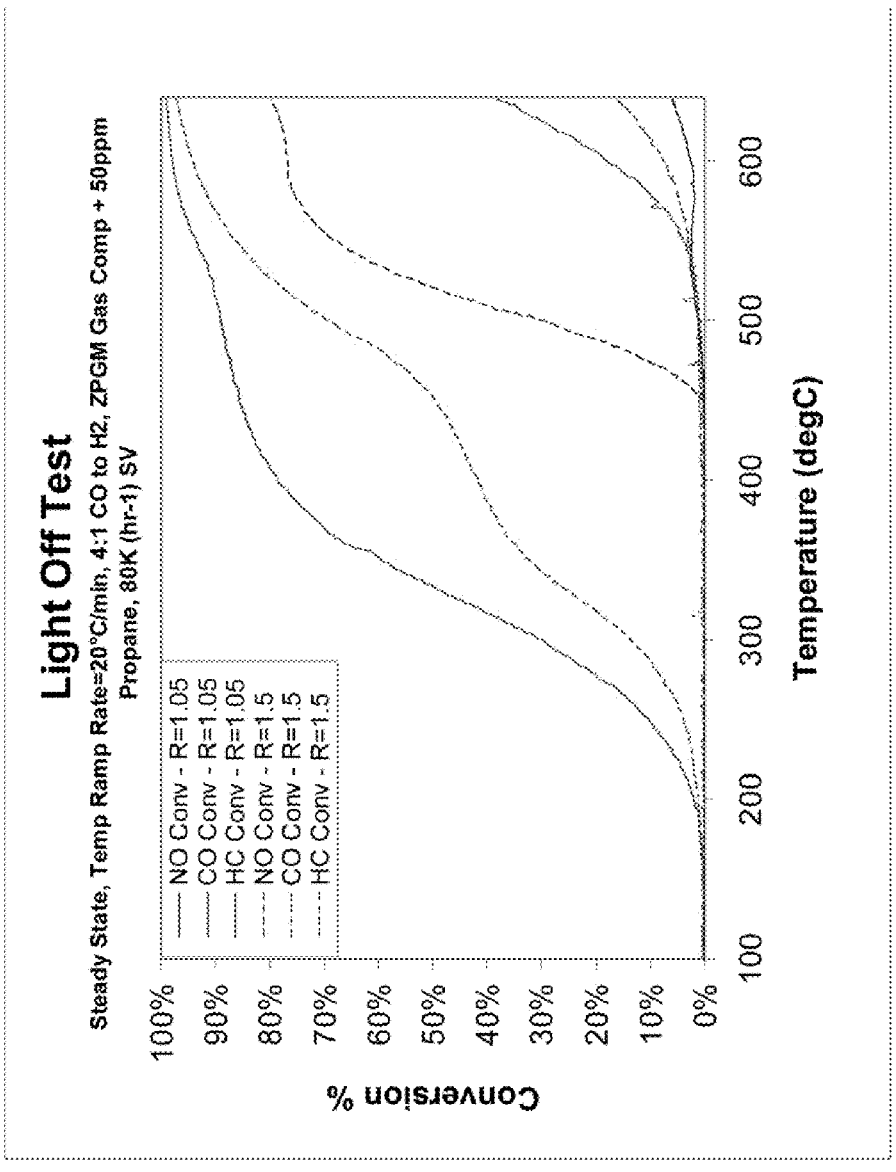
Figure 22. Light-off at R = 1.05 and R =1.5 for Aged (800C / 16h) Type F Catalyst: $CuLa_{0.04}Al_{1.96}O_4$

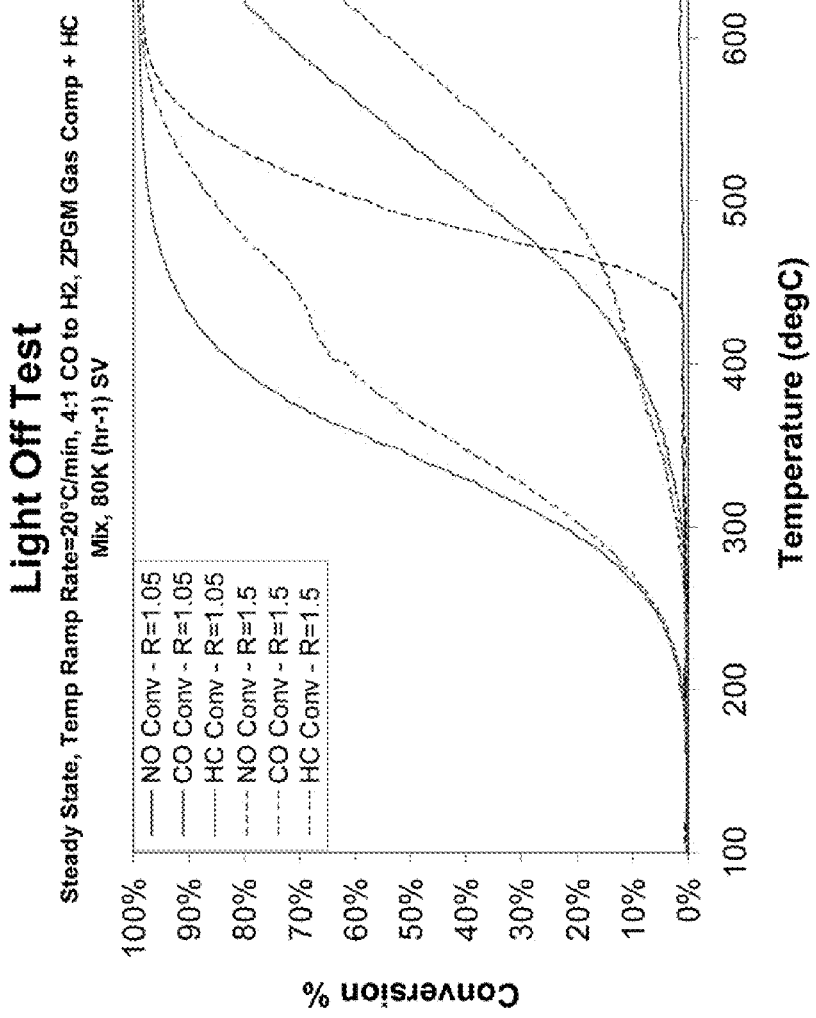
Figure 23. Light-off at R = 1.05 and R =1.5 for Aged (800C / 16h) Type F Catalyst: $Cu_{0.5}Fe_{0.5}La_{0.04}Al_{1.96}O_4$

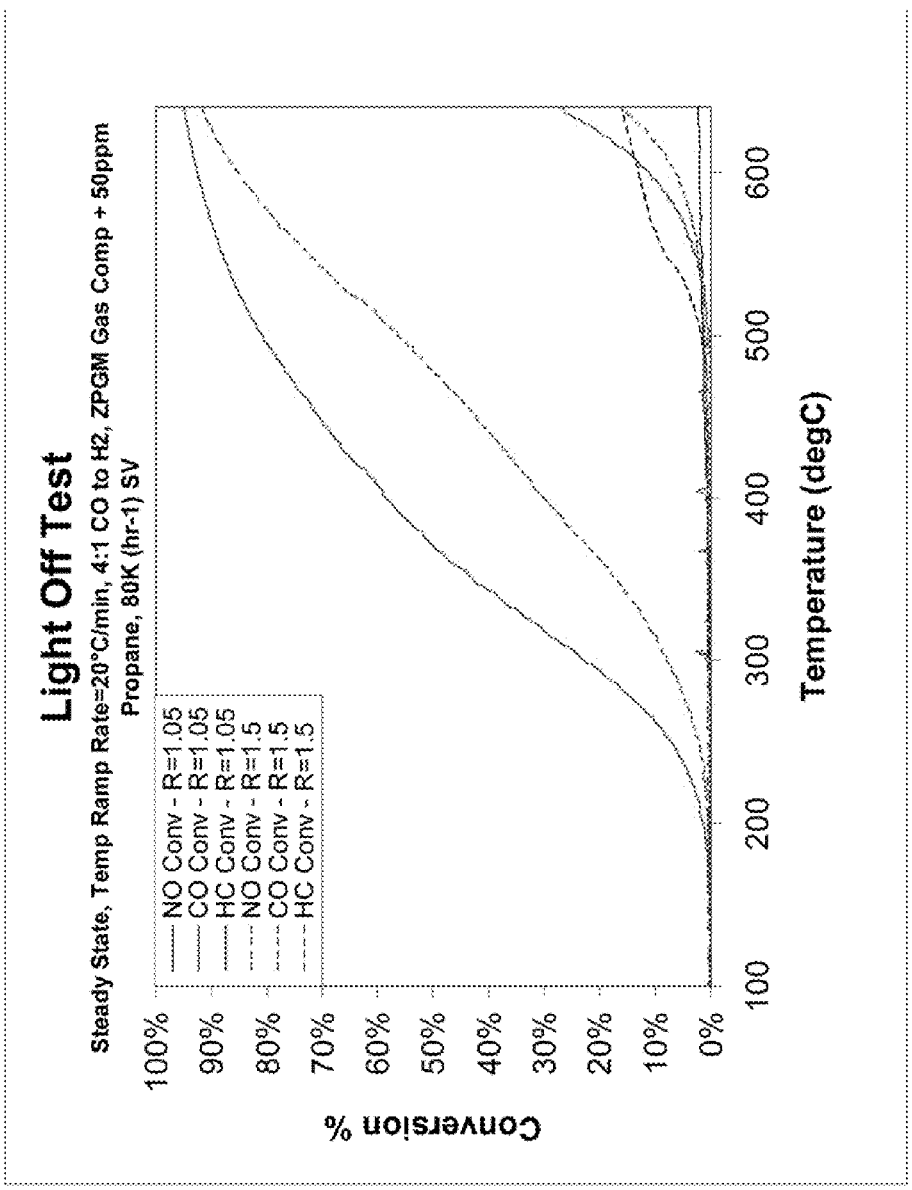
Figure 24. Light-off at R = 1.05 and R =1.5 for Aged (800C / 16h) Type F Catalyst: $CuLa_{0.04}La_{1.47}Mn_{0.49}O_4$

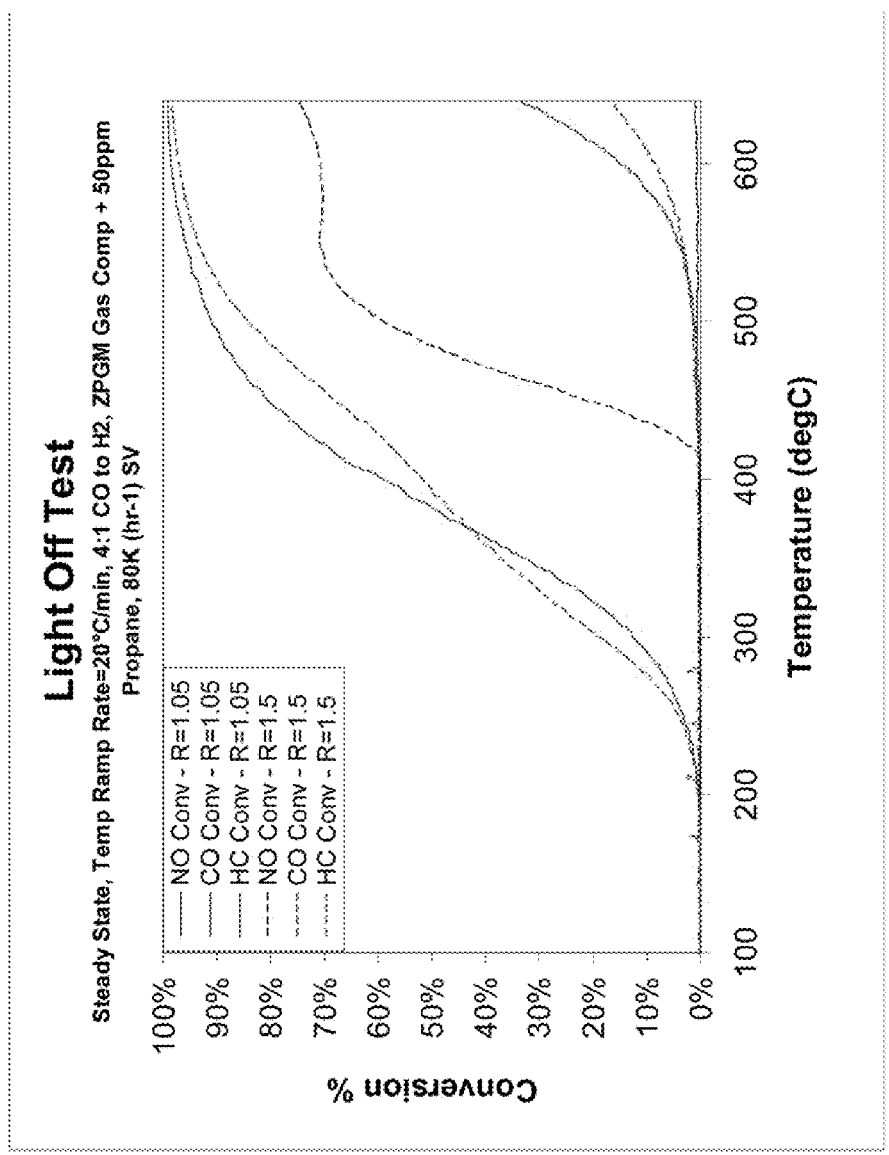
Figure 25. Light-off at R = 1.05 and R =1.5 for Aged (800C / 16h) Type G Catalyst: 10% Ag / $Cu_{0.5}Fe_{0.5}La_{0.04}Al_{1.96}O_4$

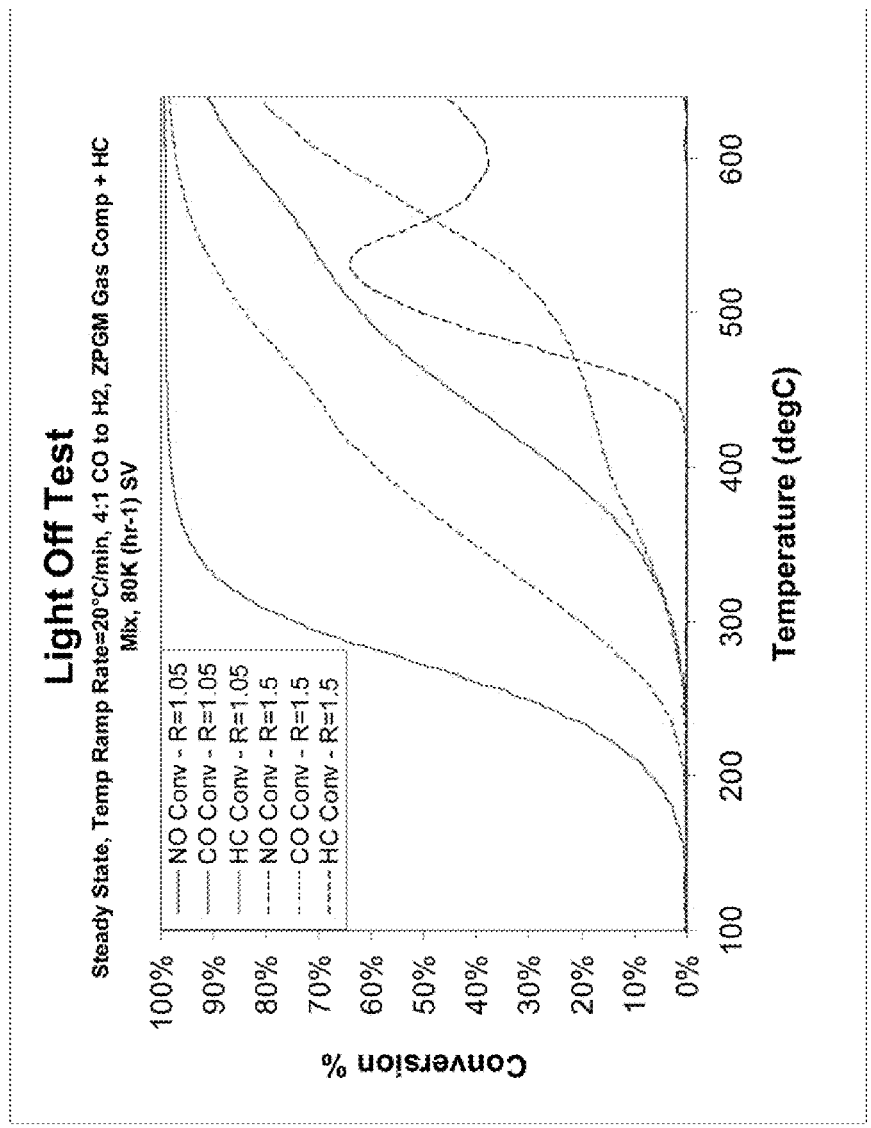
Figure 26. Light-off at R = 1.05 and R =1.5 for Aged (800C / 16h) Type G Catalyst: 10% Cu / $CuLa_{0.04}Al_{1.96}O_4$

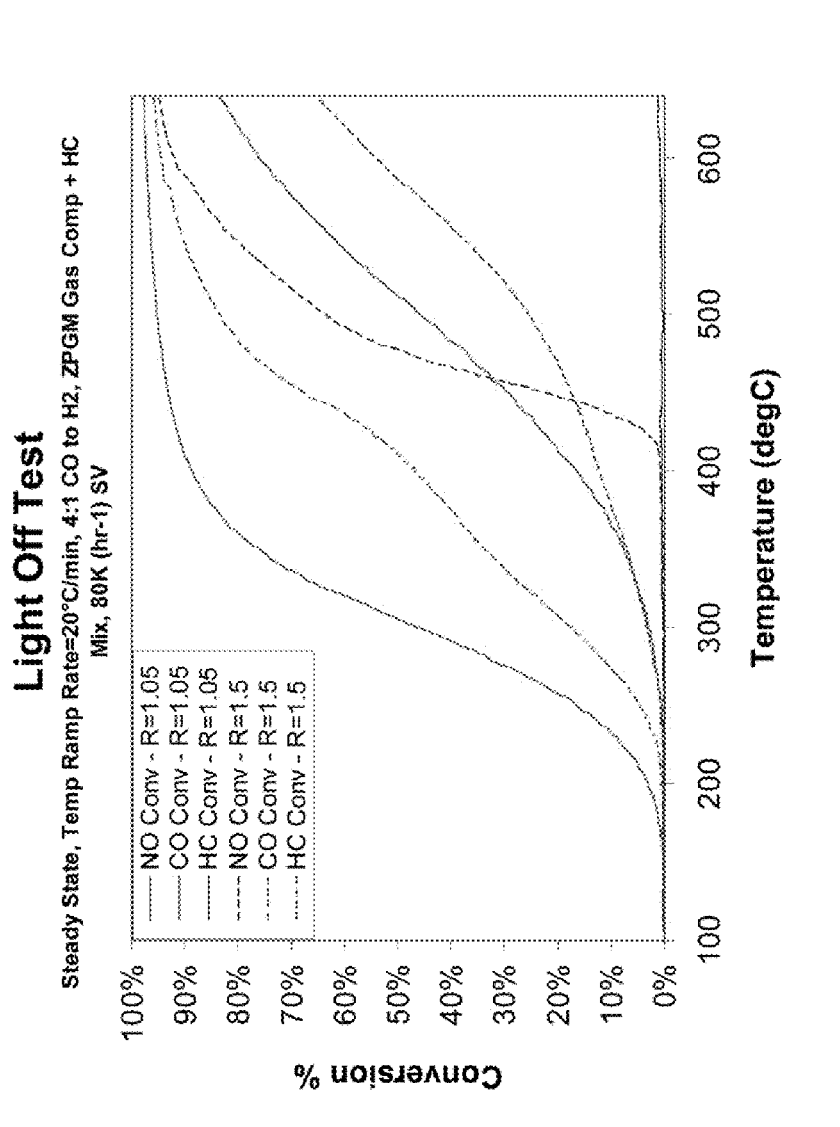
Figure 27. Light-off at R = 1.05 and R =1.5 for Aged (800C / 16h) Type G/D Catalyst: 20% CuO / MgLa$_{0.04}$Al$_{1.96}$O$_4$

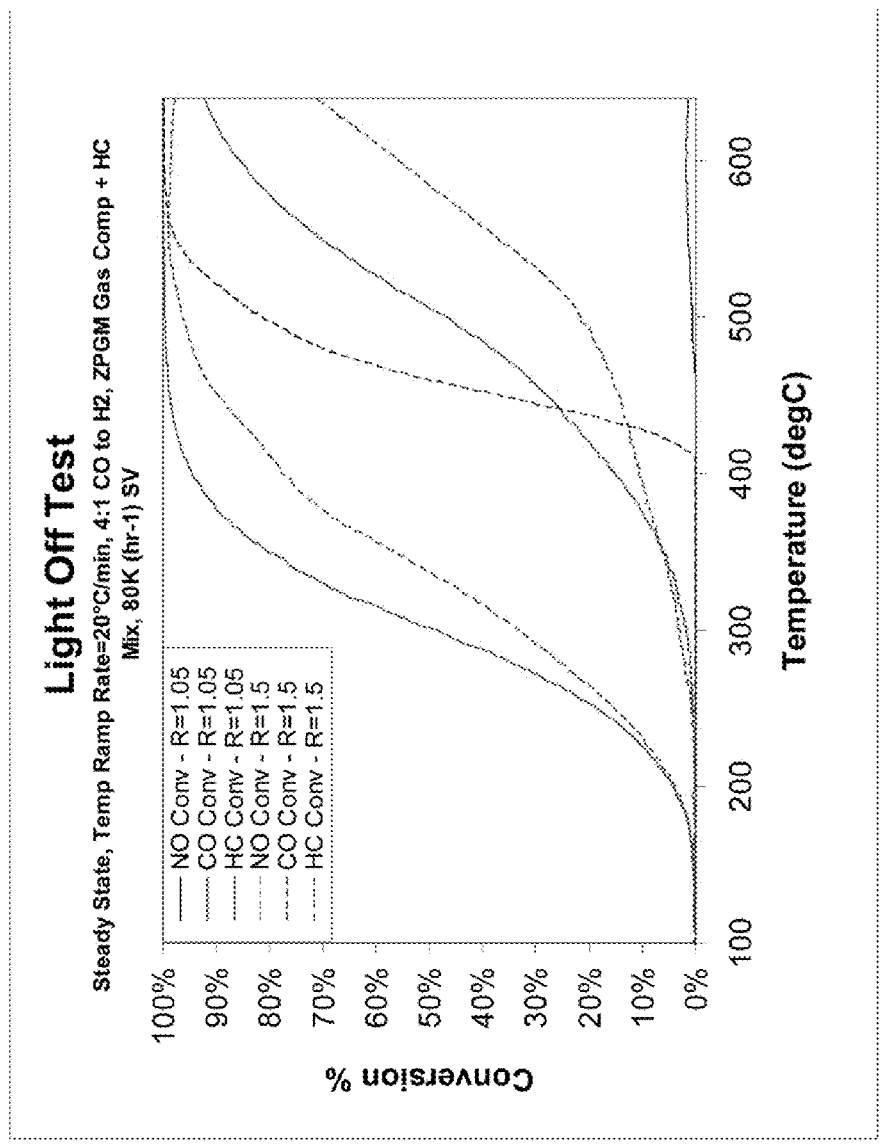
Figure 28. Light-off at R = 1.05 and R =1.5 for Aged (800C / 16h) Type G/D Catalyst: 10% Cu + 12% Ce / MgLa$_{0.04}$Al$_{1.96}$O$_4$

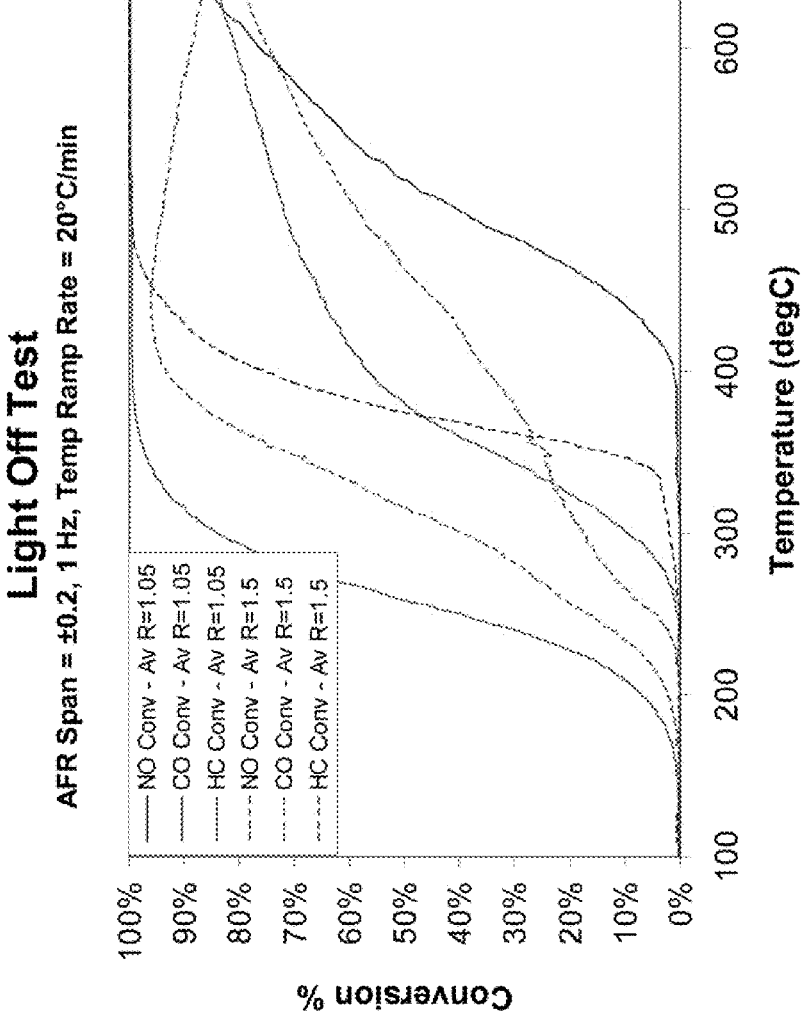
Figure 29. Light-off at R = 1.05 and R =1.5 for Aged (800C / 16h) Type D Catalyst: 12% CuO / $Ce_{0.6}Zr_{0.3}La_{0.1}O_2$ + $MgLa_{0.04}Al_{1.96}O_4$, 40:60

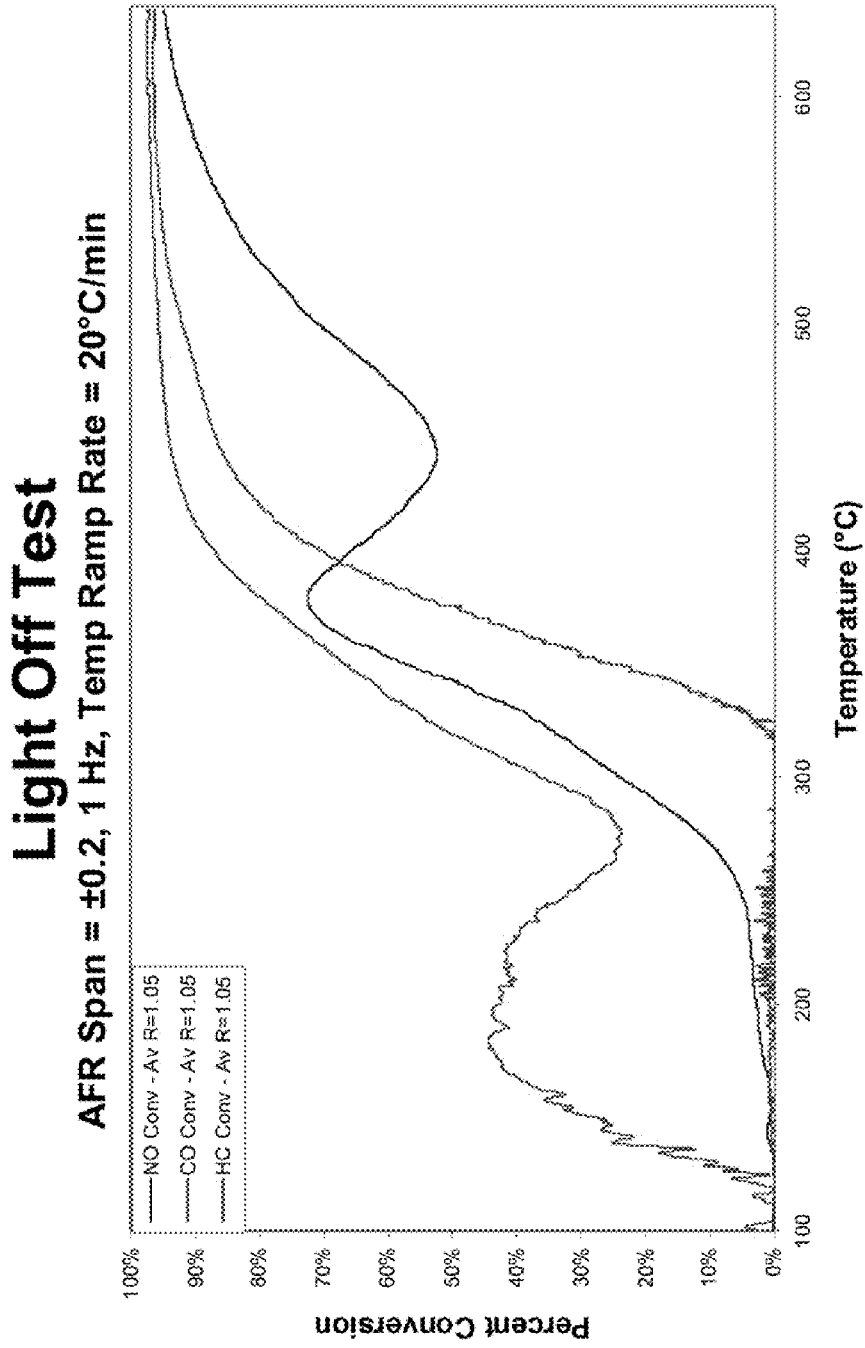
Figure 30. Light-off at R = 1.05 for Fresh Type I (Copper Dispersed on Zeolite) Catalyst: 5% Cu + 8% Ga / ZSM-5

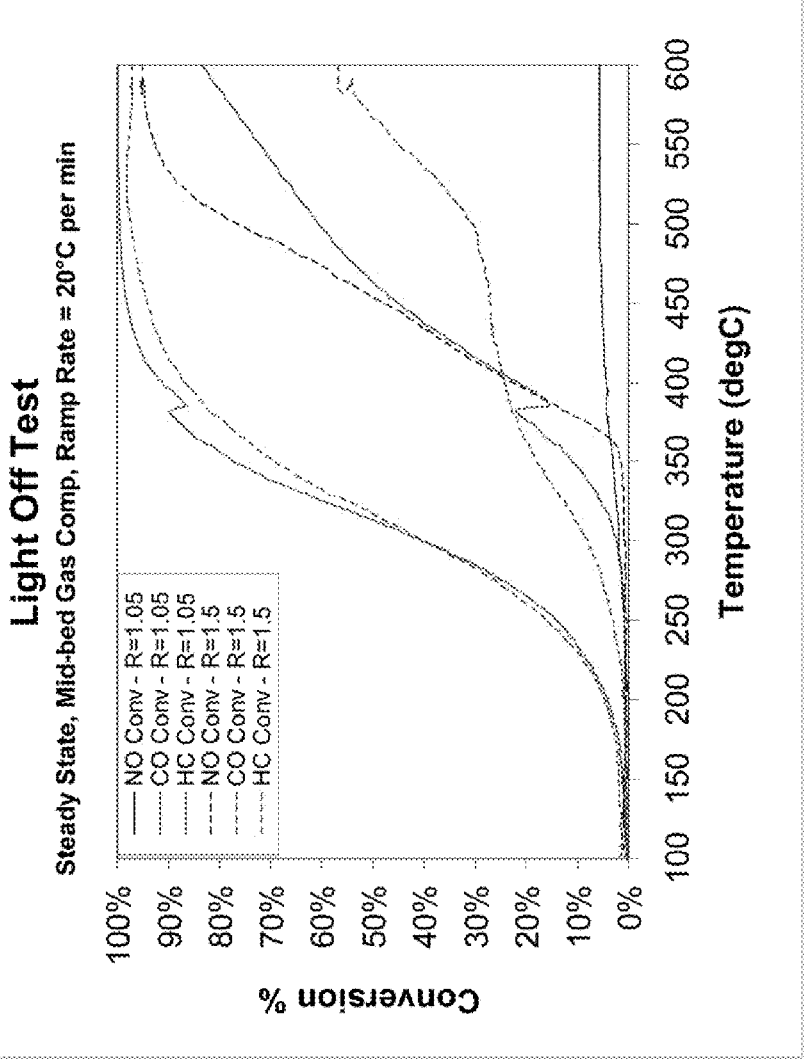
Figure 31. Light-off at R = 1.05 and R =1.5 for Aged (800C / 16h) Architecture Type 3 Catalyst: WC: La-Al$_2$O$_3$ + Ce$_{0.6}$Zr$_{0.3}$Nd$_{0.05}$Pr$_{0.05}$O$_2$; 60:40; 100 g/L and OC: 12% Cu on Ce$_{0.6}$Zr$_{0.3}$Nd$_{0.05}$Pr$_{0.05}$O$_2$; 150g/L

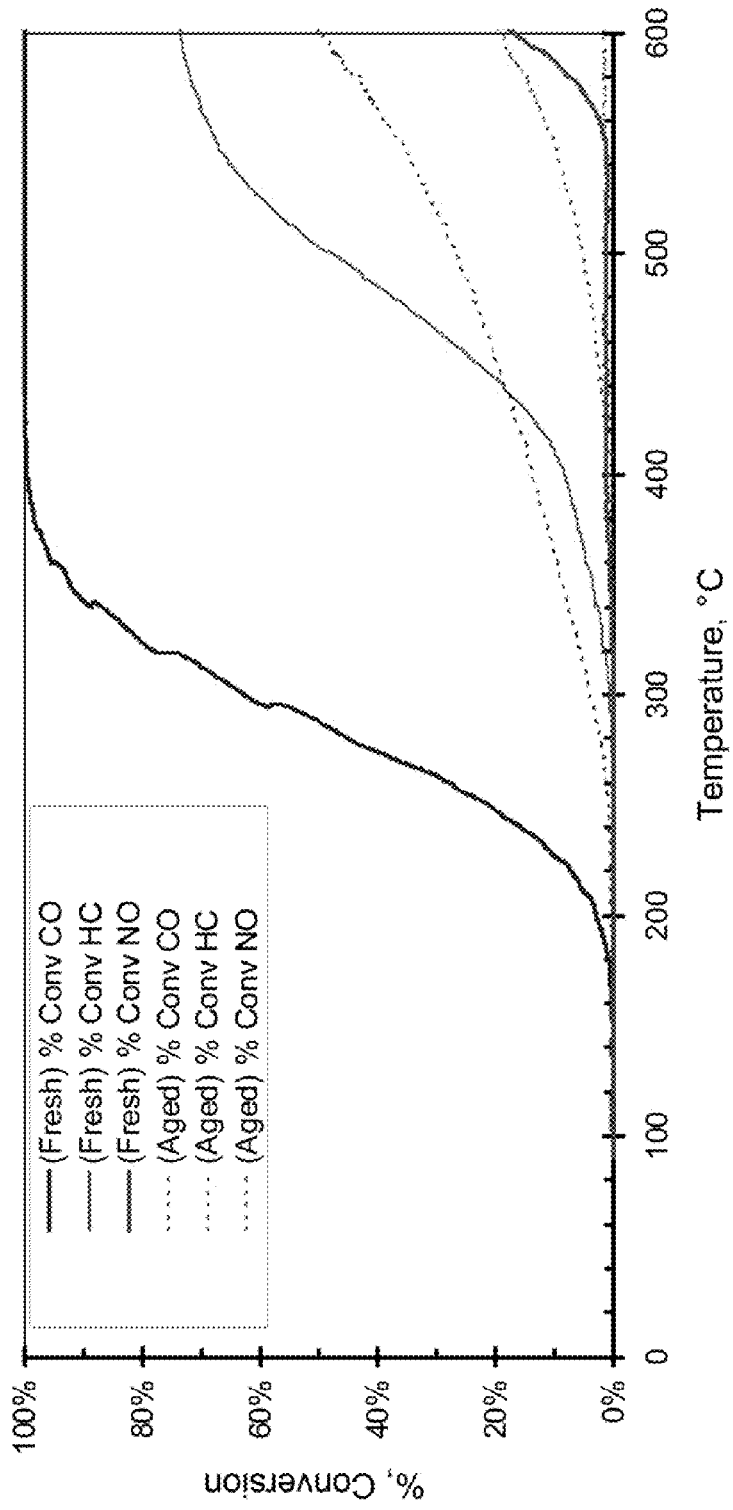
Figure 32. ZPGM-1 Light-off for Fresh and Aged (1050C / 10h) Catalyst

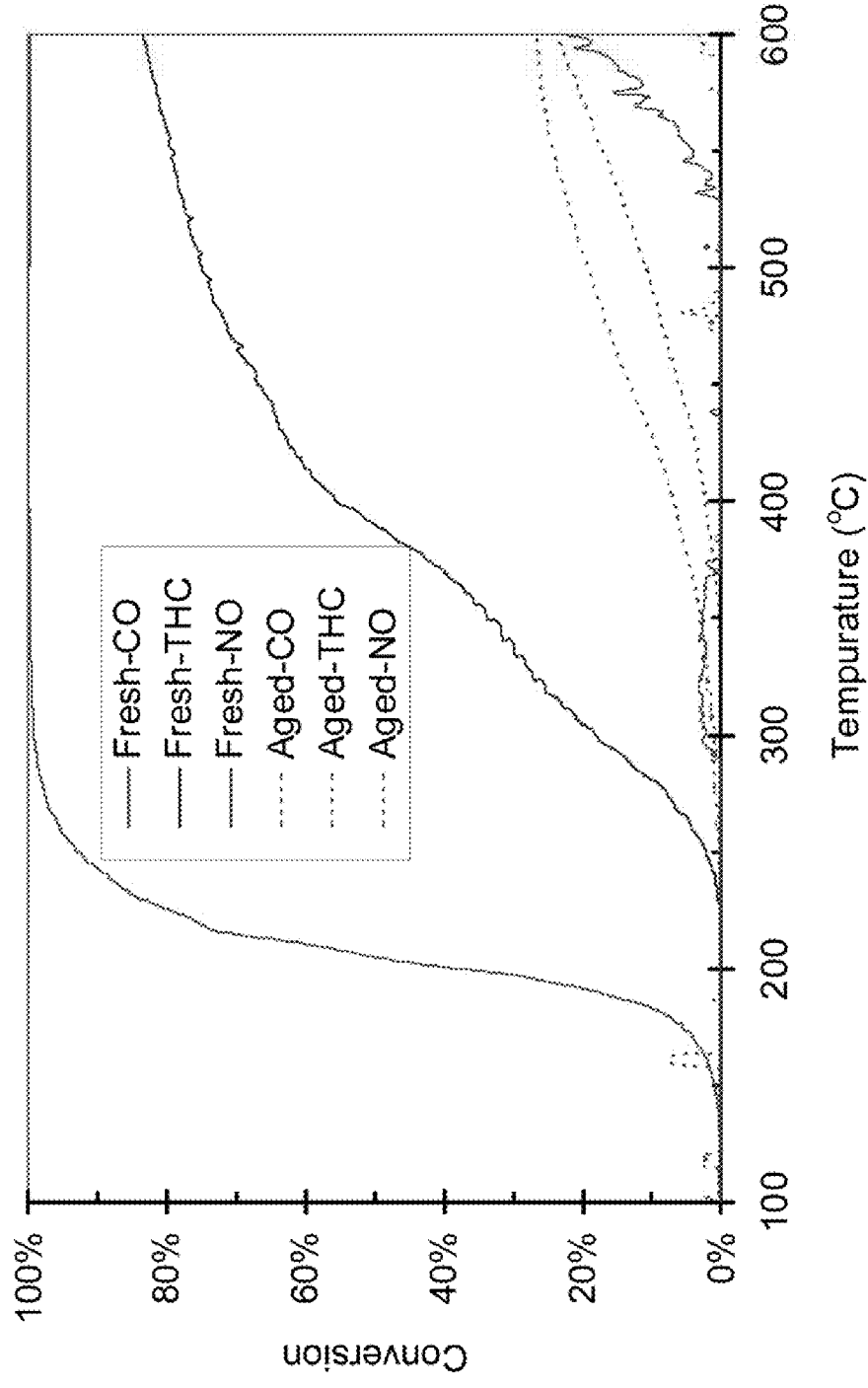
Figure 33. ZPGM-2 Light-off for Fresh and Aged (1050C / 10h) Catalyst

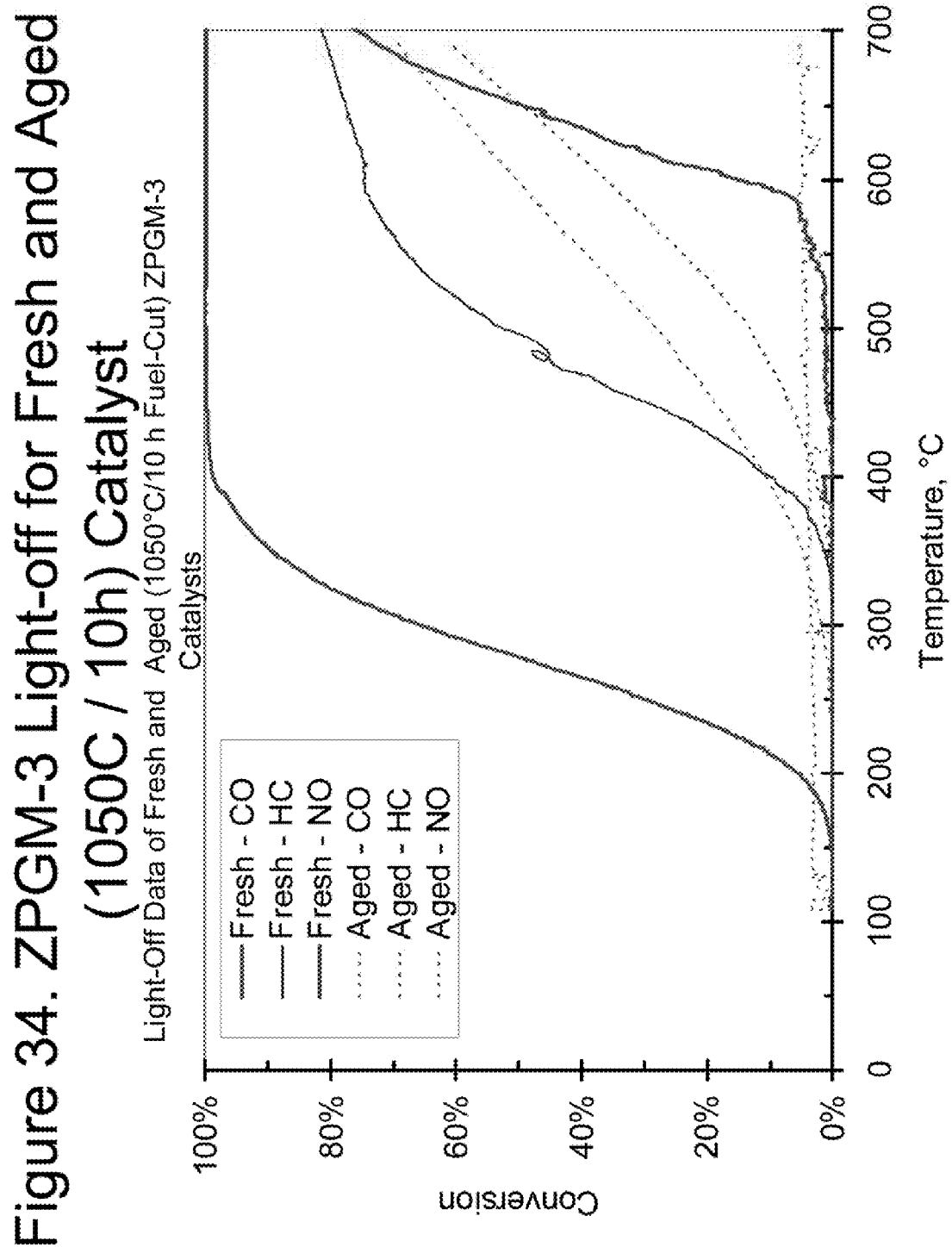
Figure 34. ZPGM-3 Light-off for Fresh and Aged (1050C / 10h) Catalyst

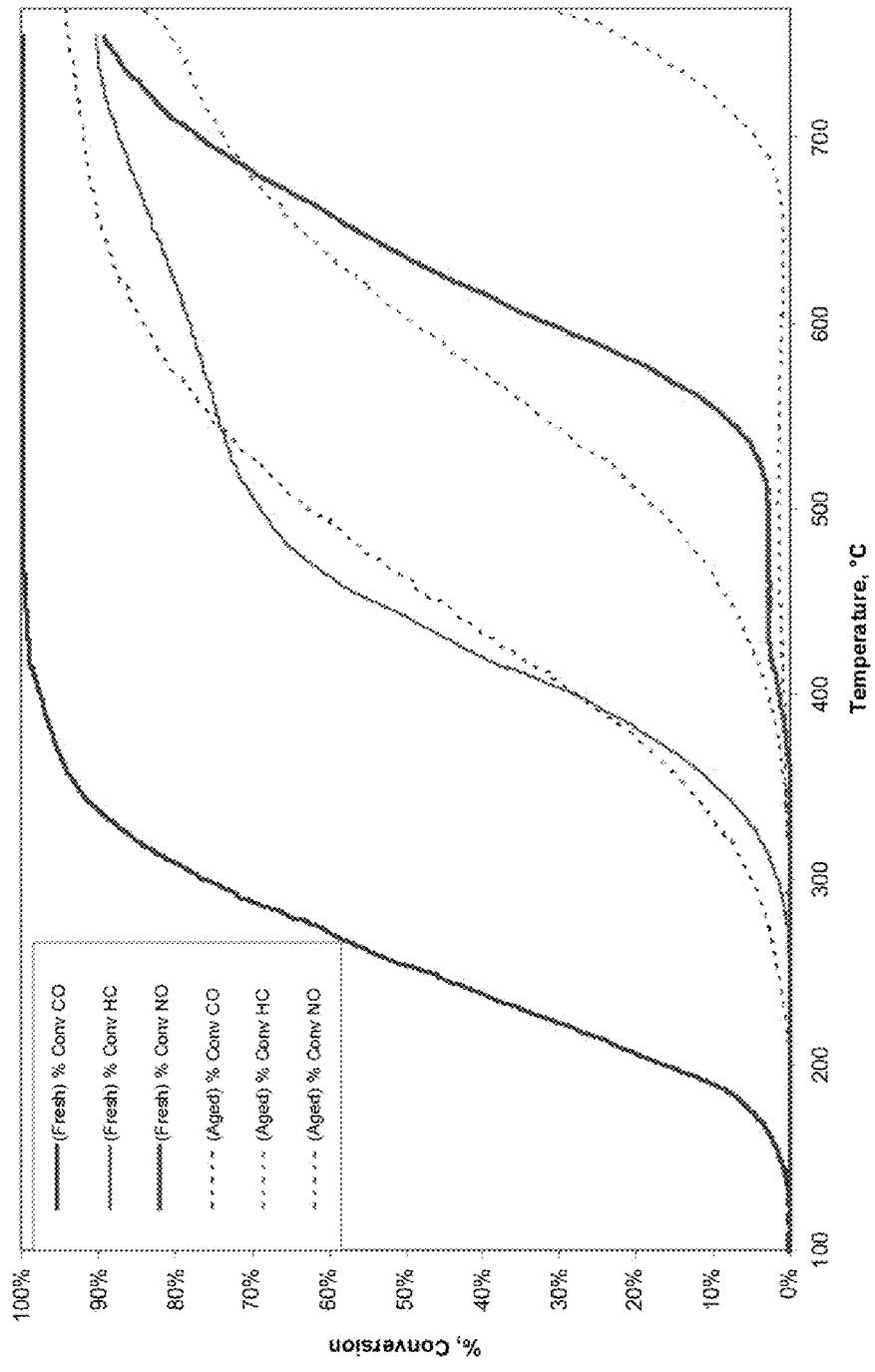
Figure 35. ZPGM-4 Light-off for Fresh and Aged (1050C / 10h) Catalyst

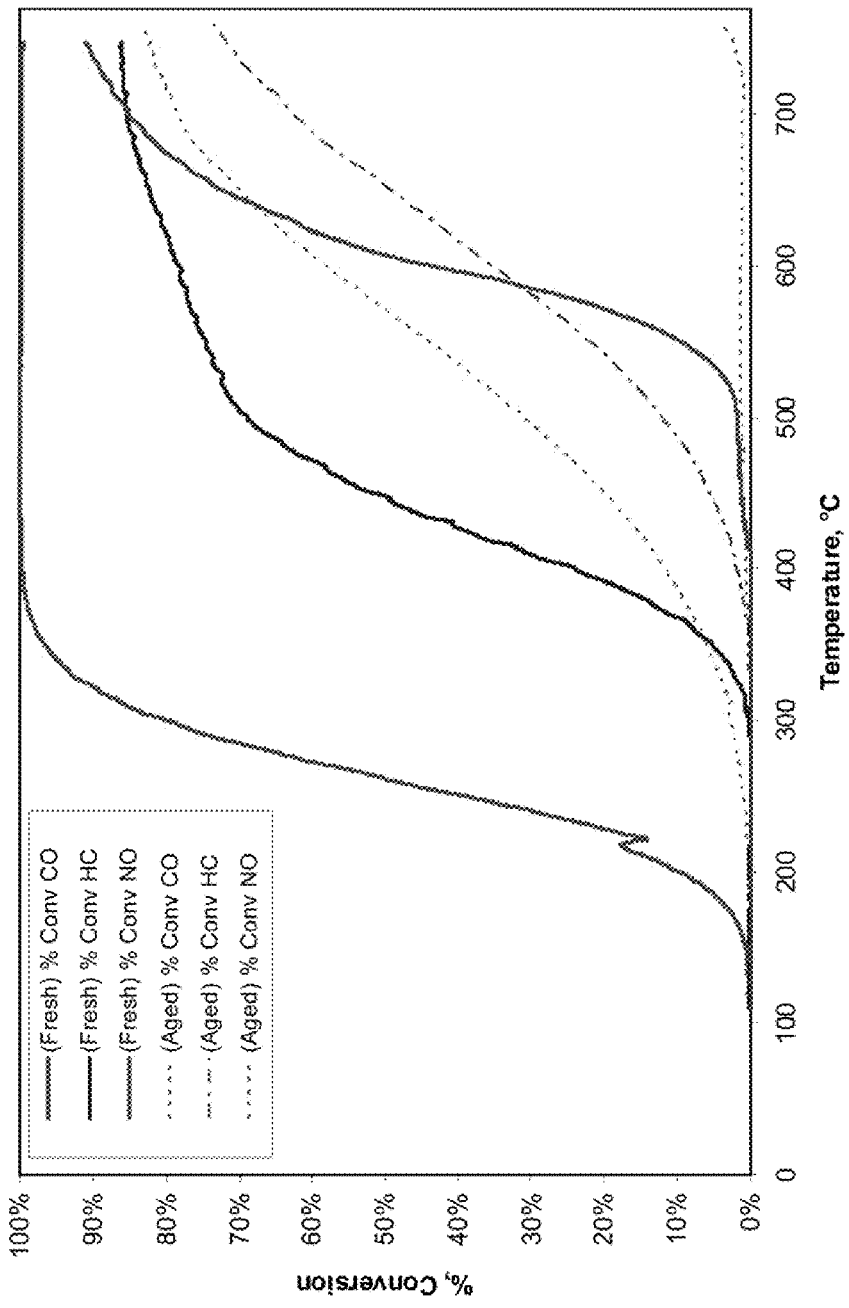
Figure 36. ZPGM-5 Light-off for Fresh and Aged (1050C / 10h) Catalyst

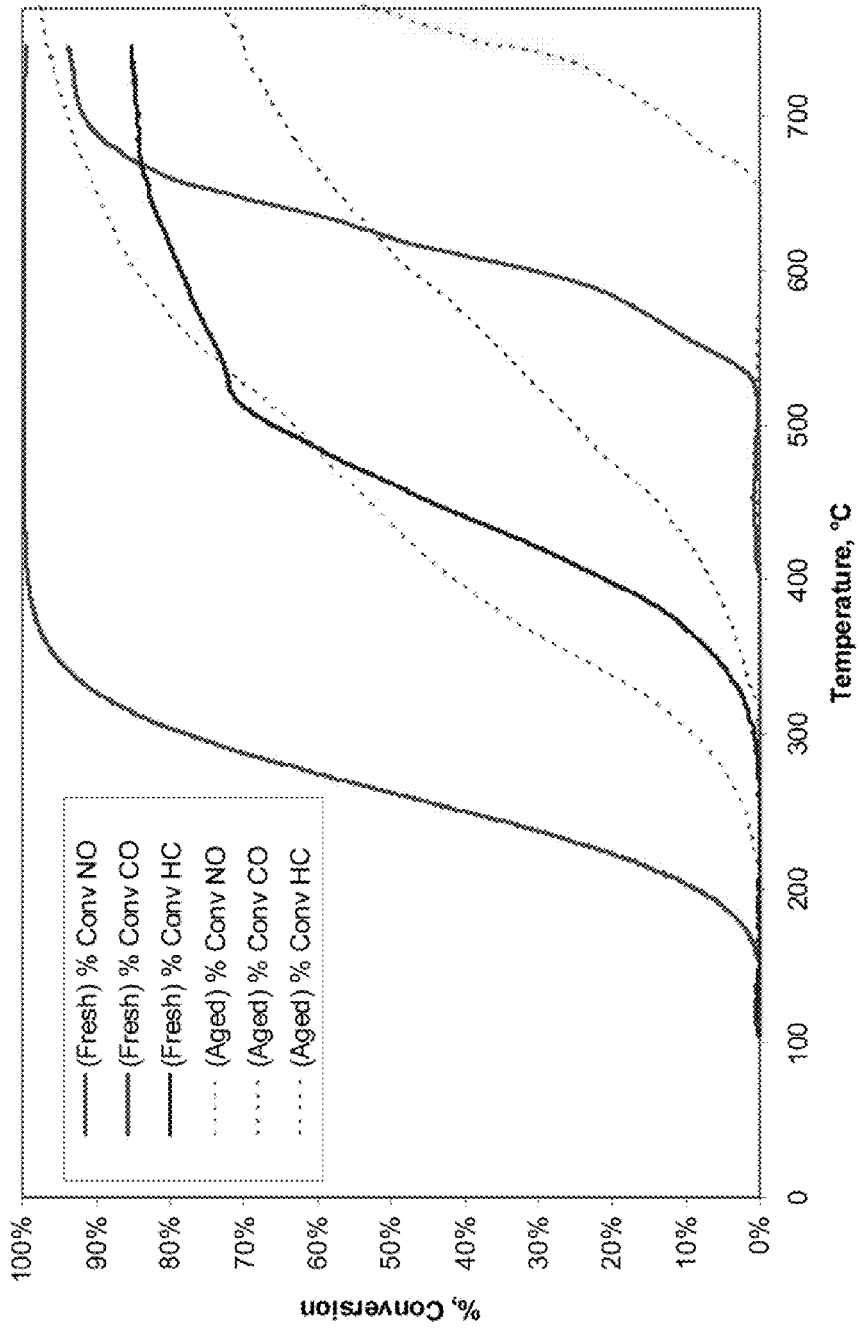
Figure 37. ZPGM-6 Light-off for Fresh and Aged (1050C / 10h) Catalyst

ZERO PLATINUM GROUP METAL CATALYSTS

RELATED APPLICATIONS

This application is a continuation application of U.S. application Ser. No. 12/215,694, which was filed on Jun. 27, 2008 and is still pending, and which is incorporated herein by reference in its entirety.

TECHNICAL FIELD OF THE INVENTION

The present invention relates to catalysts which are free of any platinum group metals for reducing emissions of nitrous oxide, carbon monoxide, hydrocarbons, and sulfur in exhaust streams.

BACKGROUND OF THE INVENTION

Catalysts in catalytic converters have been used to decrease the pollution caused by exhaust from various sources, such as automobiles, utility plants, processing and manufacturing plants, airplanes, trains, all terrain vehicles, boats, mining equipment, and other engine-equipped machines. A common catalyst used in this way is the three-way catalyst ("TWC"). The TWC works by converting carbon monoxide, hydrocarbons, and nitrogen oxides into less harmful compounds or pollutants. Specifically, a TWC works by simultaneously reducing the nitrogen oxides to nitrogen and oxygen, oxidizing carbon monoxide to less harmful carbon dioxide, and oxidizing unburnt hydrocarbons to carbon dioxide and water. The prior art TWC is made using at least some platinum group metals. Platinum group metals are defined in this specification to mean platinum, palladium, ruthenium, iridium, osmium, and rhodium in this application unless otherwise stated.

With the ever stricter standards for acceptable emissions, the demand on platinum group metals continues to increase due to their efficiency in removing pollutants from exhaust. However, this demand along with other demands for platinum group metals places a strain on the supply of platinum group metals, which in turn drives up the cost of platinum group metals and therefore catalysts and catalytic converters. Therefore, there is a need for a catalyst that does not require platinum group metals, and has a similar or better efficiency as the prior art catalysts.

SUMMARY OF THE INVENTION

The present invention pertains to a catalyst system comprising a substrate and a washcoat, wherein the catalyst system is substantially free of platinum group metals. The washcoat comprises at least one oxide solid, wherein the oxide solid is selected from the group consisting of a carrier material oxide, a catalyst, and a mixture thereof. The carrier material oxide comprises one or more selected from the group consisting of an oxygen storage material, aluminum oxide, doped aluminum oxide, spinel, delafossite, lyonsite, garnet, perovskite, pyrochlore, doped ceria, fluorite, zirconium oxide, doped zirconia, titanium, tin oxide, silicon dioxide, and mixtures thereof. The catalyst comprises one or more selected from the group consisting of a ZPGM transition metal catalyst, a mixed metal oxide catalyst, a zeolite catalyst, and mixtures thereof. The oxygen storage material comprises one or more selected from the group consisting of cerium, zirconium, lanthanum, yttrium, lanthanides, actinides, and mixtures thereof. The catalyst system may optionally comprise an overcoat comprising at least one oxide solid, wherein the overcoat oxide solid comprises one or more selected from the group consisting of a carrier material oxide, a catalyst, and mixtures thereof.

The present invention also pertains to a catalyst system comprising a substrate, a washcoat, and an overcoat, wherein the catalyst system is substantially free of platinum group metals. The washcoat comprises one or more selected from the group consisting of a carrier material oxide, ceramic, and mixtures thereof. The overcoat comprises a catalyst. The catalyst of the overcoat comprises one or more selected from the group consisting of a ZPGM transition metal catalyst, a mixed metal oxide catalyst, a zeolite catalyst, and mixtures thereof. The catalyst system may further comprise one or more selected from the group consisting of a perovskite, a spinel, a lyonsite, an oxygen storage material, alumina, and mixtures thereof.

A ZPGM transition metal catalyst comprises one or more transition metals. A mixed metal oxide catalyst comprises a mixed metal oxide and at least one transition metal, wherein the mixed metal oxide comprises one or more selected from the group consisting of alkali metals, alkaline earth metals, lanthanides, actinides, and mixtures thereof. A zeolite catalyst comprises at least one zeolite and at least one transition metal. The zeolite comprises one or more selected from the group consisting of ZSM5, heulandite, chabazite, and mixtures thereof. The transition metal comprises one or more selected from the group consisting of chromium, gallium, manganese, iron, cobalt, nickel, copper, niobium, molybdenum, tungsten, silver, and mixtures thereof The present invention also pertains to a method of making a catalyst system by impregnation, comprising depositing a washcoat on a substrate and treating the washcoat and the substrate to convert metal salts into metal oxides, wherein the catalyst system is substantially free of platinum group metals. The washcoat comprises at least one oxide solid, wherein the oxide solid comprises one or more selected from the group consisting of a carrier material oxide, a catalyst, and mixtures thereof. The method may further comprise after treating, depositing an overcoat on the washcoat and treating the overcoat and washcoat. The overcoat comprises at least one oxide solid, wherein the oxide solid comprises one or more selected from the group consisting of a carrier material oxide, a catalyst, and mixtures thereof.

The present invention also pertains to a method of making a catalyst system by precipitation, comprising precipitating a transition metal salt on a washcoat, treating the precipitated transition metal salt and the washcoat, depositing the precipitated transition metal salt and the washcoat on a substrate, and treating the precipitated transition metal salt and the washcoat on the substrate, wherein the catalyst system is substantially free of platinum group metals. The transition metal salt comprises at least one transition metal and at least one carrier material oxide. The method may further comprise after treating the precipitated transition metal salt and the washcoat on the substrate, depositing an overcoat on the treated precipitated transition metal salt and the washcoat, and treating the overcoat, the treated precipitated transition metal salt and the washcoat.

The present invention also pertains to a method of making a catalyst system by co-milling, comprising milling together a catalyst and at least one carrier material oxide, depositing the milled catalyst in the form of a washcoat on to a substrate; and treating the substrate and the washcoat, wherein the catalyst system is substantially free of platinum group metals. The method may further comprise depositing an overcoat on the washcoat and treating the overcoat and the washcoat. The overcoat comprises at least one oxide solid, wherein the oxide solid comprises one or more selected from the group consisting of a carrier material oxide, a catalyst, and mixtures thereof.

The present invention also pertains to a method of reducing pollutants including, but not limited to nitrogen oxide, carbon monoxide, hydrocarbons, and sulfur emitted in exhaust comprising flowing exhaust substantially through a catalyst system as described herein and reducing the pollutants in the exhaust.

The present invention also pertains to a catalyst system comprising a first catalyst system and a second catalyst system. The first catalyst system comprises a substrate and a washcoat, wherein the washcoat comprises at least one oxide solid and wherein the first catalyst system is substantially free of platinum group metals. The second catalyst system comprises at least one platinum group metal. The first and second catalyst systems are in series in any order, wherein at least a substantial portion of a gas stream passes through the first catalyst and the second catalyst sequentially. More than a first and second catalyst system may be used in a catalyst system, e.g. a third catalyst system or more.

BRIEF DESCRIPTION OF THE FIGURES

FIG. 4 shows the pore volume results for fresh catalyst systems ZPGM-1 through ZPGM-5;

FIG. 5 shows the pore volume results for aged catalyst systems ZPGM-1 through ZPGM-5;

FIG. 6 shows the surface area summary for fresh and aged catalyst systems ZPGM-1 through ZPGM-5;

FIG. 7 shows the x-ray diffraction analysis of a ZPGM-1 catalyst system (fresh and aged $Ce_{0.6}La_{0.4}Mn_{0.6}Cu_{0.4}O_x$ powders);

FIG. 8 shows the x-ray diffraction analysis of a ZPGM-2 catalyst system (fresh and aged);

FIG. 9 shows the x-ray diffraction analysis of a ZPGM-3 catalyst system (fresh and aged);

FIG. 10 shows the x-ray diffraction analysis of a ZPGM-4 catalyst system (fresh and aged);

FIG. 11 shows the x-ray diffraction analysis of a ZPGM-5 catalyst system (fresh and aged);

FIG. 12 shows the x-ray diffraction analysis of a ZPGM-6 catalyst system (fresh and aged);

FIG. 13 shows the sweep test results for a ZPGM-1 catalyst system (fresh and aged);

FIG. 14 shows the sweep test results for a ZPGM-2 catalyst system (fresh and aged);

FIG. 15 shows the sweep test results for a ZPGM-3 catalyst system (fresh and aged);

FIG. 16 shows the sweep test results for a ZPGM-4 catalyst system (fresh and aged);

FIG. 17 shows the sweep test results for a ZPGM-5 catalyst system (fresh and aged);

FIG. 18 shows the sweep test results for a ZPGM-6 catalyst system (fresh and aged);

FIG. 19 shows the results of light off tests for an example of a Type D ZPGM transition metal catalyst;

FIG. 20 shows the results of light off tests for an example of a Type D/Type H ZPGM transition metal catalyst;

FIG. 21 shows the results of light off tests for an example of a Type D/Type H ZPGM transition metal catalyst;

FIG. 22 shows the results of light off tests for an example of a Type F mixed metal oxide catalyst;

FIG. 23 shows the results of light off tests for an example of a Type F mixed metal oxide catalyst;

FIG. 24 shows the results of light off tests for an example of a Type F mixed metal oxide catalyst;

FIG. 25 shows the results of light off tests for an example of a Type G ZPGM transition metal catalyst;

FIG. 26 shows the results of light off tests for an example of a Type G ZPGM transition metal catalyst;

FIG. 27 shows the results of light off tests for an example of a Type G/Type D ZPGM transition metal catalyst;

FIG. 28 shows the results of light off tests for an example of a Type G/Type D ZPGM transition metal catalyst;

FIG. 29 shows the results of ramp light off tests for an example of a Type D ZPGM transition metal catalyst;

FIG. 30 shows the results of ramp light off tests for an example of a Type I;

FIG. 31 shows light off test results for architecture 3;

FIG. 32 shows the results of a light-off test for a ZPGM-1 catalyst system (fresh and aged);

FIG. 33 shows the results of a light-off test for a ZPGM-2 catalyst system (fresh and aged);

FIG. 34 shows the results of a light-off test for a ZPGM-3 catalyst system (fresh and aged);

FIG. 35 shows the results of a light-off test for a ZPGM-4 catalyst system (fresh and aged);

FIG. 36 shows the results of a light-off test for a ZPGM-5 catalyst system (fresh and aged); and FIG. 37 shows the results of a light-off test for a ZPGM-6 catalyst system (fresh and aged).

DEFINITIONS

The following definitions are provided to clarify the invention.

Figure 1:
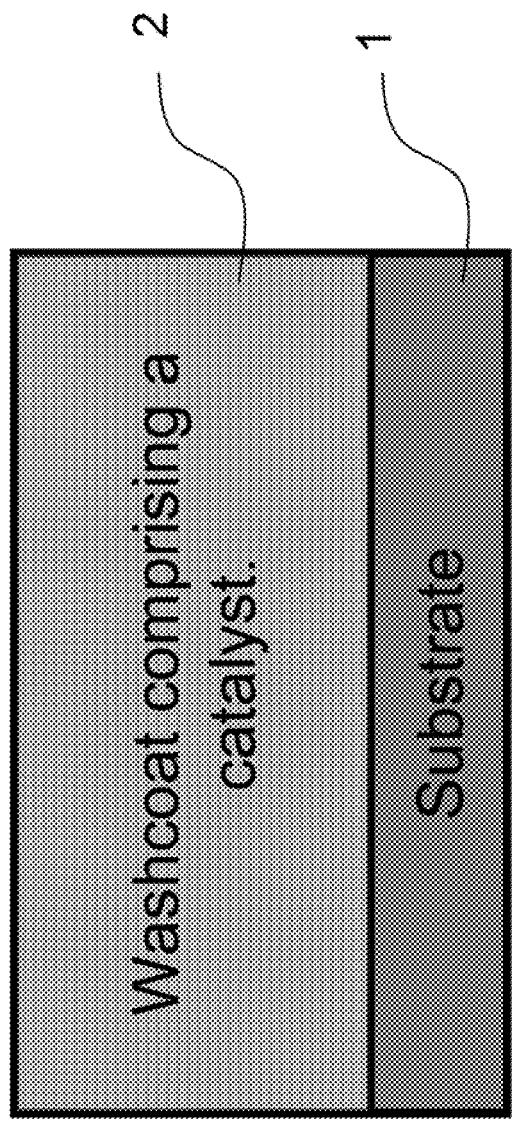
FIG. 1 shows a schematic of Architecture 1 for the catalyst systems of the present invention.
Figure 2:
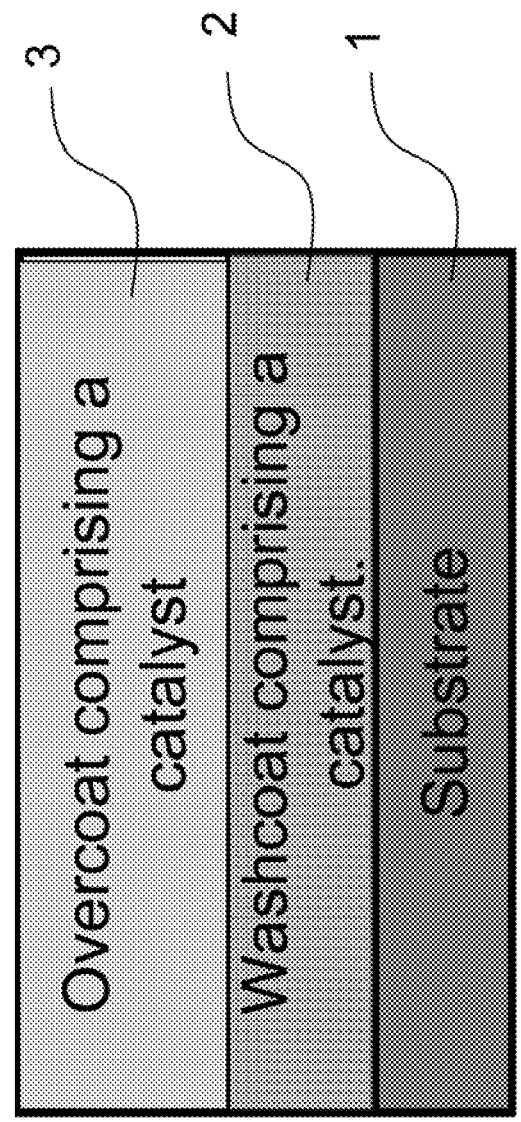
FIG. 2 shows a schematic of Architecture 2 for the catalyst systems of the present invention.
Figure 3:
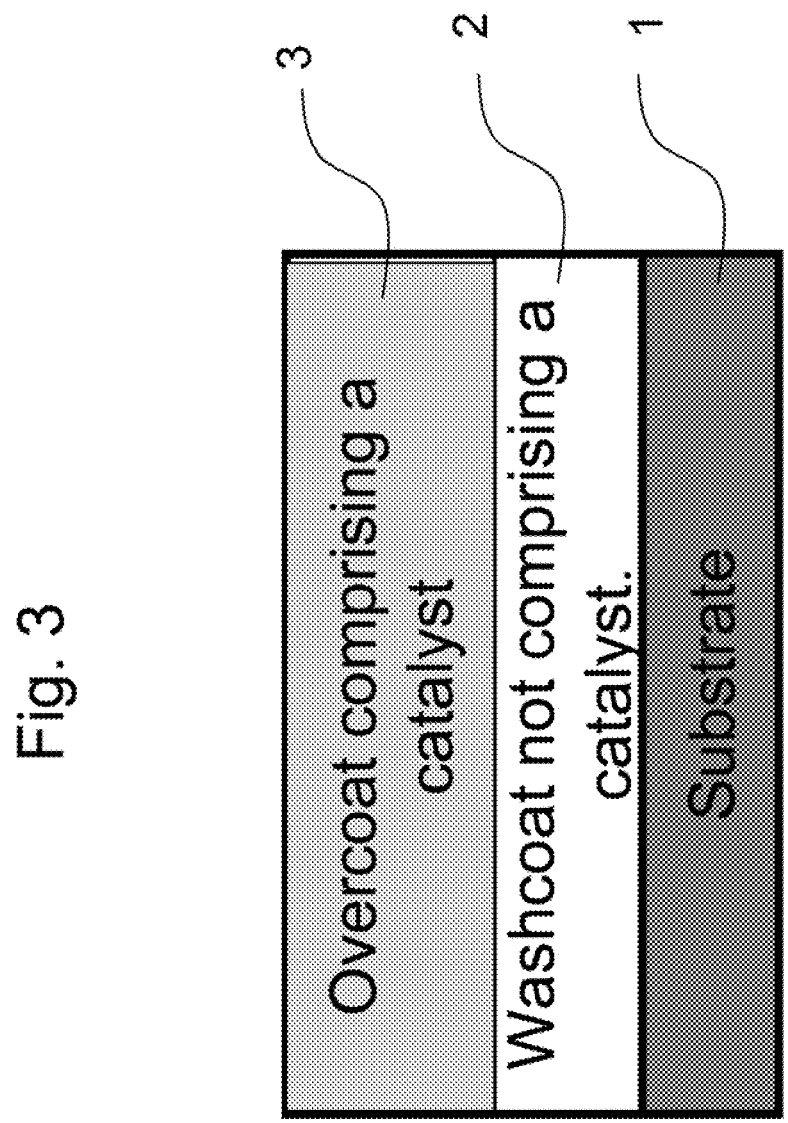
FIG. 3 shows a schematic of Architecture 3 for the catalyst systems of the present invention.

The term "catalyst system" is defined in this specification to mean a substrate, a washcoat, and optionally an overcoat as illustrated by Architecture 1, Architecture 2, or Architecture 3 as set forth in FIGS. 1, 2, and 3, respectively.

The term "substrate" is defined in this specification to mean any material known in the art for supporting a catalyst and can be of any shape or configuration that yields a sufficient surface area for the deposit of the washcoat and/or overcoat, including, but not limited to a honeycomb, pellets, or beads.

The term "washcoat" is defined in this specification to mean a coating comprising one or more oxide solids that is coupled with a substrate.

The term "overcoat" is defined in this specification to mean a coating comprising one or more oxide solids that is coupled with a substrate and a washcoat.

The term "oxide solid" is defined in this specification to mean one or more selected from the group consisting of a carrier material oxide, a catalyst, and mixtures thereof.

The term "carrier material oxide" is defined in this specification to mean materials used for providing a surface for at least one catalyst and comprises one or more selected from the group consisting of oxygen storage material, aluminum oxide, doped aluminum oxide, spinel, delafossite, lyonsite, garnet, perovskite, pyrochlore, doped ceria, fluorite, zirconium oxide, doped zirconia, titanium oxide, tin oxide, silicon dioxide, zeolite, and mixtures thereof.

The term "oxygen storage material" is defined in this specification to mean materials that can take up oxygen from oxygen-rich feed streams and release oxygen to oxygen-deficient feed streams. The oxygen storage material comprises one or more oxides selected from the group consisting of cerium, zirconium, lanthanum, yttrium, lanthanides, actinides, and mixtures thereof.

The term "catalyst" is defined in this specification to mean a catalyst for decreasing the amount of nitrogen oxide, hydrocarbon, carbon monoxide, and/or sulfur that is free of platinum group metals, preferably completely free of platinum group metals.

The term "ZPGM Transition Metal Catalyst" is defined in this specification to mean a catalyst comprising one or more transition metals.

The term "Mixed Metal Oxide Catalyst" is defined in this specification to mean a catalyst comprising at least one transition metal and at least one other metal.

The term "Zeolite Catalyst" is defined in this specification to mean a catalyst comprising at least one zeolite and at least one transition metal.

The term "transition metal" is defined in this specification to mean the transition metals of the periodic table excluding the platinum group metals, which are scandium, titanium, vanadium, chromium, manganese, iron, cobalt, nickel, copper, zinc, yttrium, zirconium, niobium, molybdenum, technetium, ruthenium, silver, cadmium, hafnium, tantalum, tungsten, rhenium, gold, mercury, rutherfordium, dubnium, seaborgium, bohrium, hassium, meitnerium, ununnilium, ununumium, ununbium, and gallium.

The term "copper" is defined in this specification to mean copper, copper complexes, copper atoms, or any other copper compounds known in the art.

The term "free" is defined in this specification to mean substantially free or completely free.

The term "impregnation component" is defined in this specification to mean one or more components added to a washcoat and/or overcoat to yield a washcoat and/or overcoat comprising a catalyst. The impregnation component comprises one or more selected from the group consisting of a transition metal, alkali and alkaline earth metal, cerium, lanthanum, yttrium, lanthanides, actinides, and mixtures thereof.

The term "depositing," "deposited," or "deposit(s)" is defined in this specification to include, without limitation, placing, adhering, curing, coating (such as vacuum coating), spraying, dipping, painting and any known process for coating a film on a substrate.

The term "treating," "treated," or "treatment" is defined in this specification to include, without limitation, precipitation, drying, firing, heating, evaporating, calcining, or mixtures thereof.

The term "platinum group metals" is defined in this specification to mean platinum, palladium, ruthenium, iridium, osmium, and rhodium.

The term "coupled with" is defined in this specification to mean the washcoat and/or overcoat is in a relationship with the substrate or each other, such that they may be directly in contact with each other; or they may be associated with each other, but there may be something in between each of them, e.g. the overcoat may be coupled with a substrate, but a washcoat may be in between the substrate and the overcoat.

Examples of catalyst systems are denoted by "ZPGM" and a number, e.g. "ZPGM-1". Examples of catalysts are denoted by "Type" and a letter, e.g. "Type A".

All percentages discussed herein are weight percent unless otherwise indicated. All ratios discussed herein are weight ratios unless otherwise indicated.

DETAILED DESCRIPTION

The catalyst system of the present invention is free of platinum group metals; decreases the amount of at least one of carbon monoxide, nitrogen oxides, hydrocarbon, and sulfur emissions; and comprises one or more catalysts.

Substrates

The substrate of the present invention may be, without limitation, a refractive material, a ceramic substrate, a honeycomb structure, a metallic substrate, a ceramic foam, a metallic foam, a reticulated foam, or suitable combinations, where the substrate has a plurality of channels and at least the required porosity. Porosity is substrate dependent as is known in the art. Additionally, the number of channels may vary depending upon the substrate used as is known in the art. The channels found in a monolith substrate are described in more detail below. The type and shape of a suitable substrate would be apparent to one of ordinary skill in the art. Preferably, all of the substrates, either metallic or ceramic, offer a three-dimensional support structure.

In one embodiment, the substrate may be in the form of beads or pellets. The beads or pellets may be formed from, without limitation, alumina, silica alumina, silica, titania, mixtures thereof, or any suitable material. In another embodiment, the substrate may be, without limitation, a honeycomb substrate. The honeycomb substrate may be a ceramic honeycomb substrate or a metal honeycomb substrate. The ceramic honeycomb substrate may be formed from, for example without limitation, sillimanite, zirconia, petalite, spodumene (lithium aluminum silicate), magnesium silicates, mullite, alumina, cordierite (e.g. $Mg_2Al_4Si_5O_{18}$), other alumino-silicate materials, silicon carbide, aluminum nitride, or combinations thereof. Other ceramic substrates would be apparent to one of ordinary skill in the art.

If the substrate is a metal honeycomb substrate, the metal may be, without limitation, a heat-resistant base metal alloy, particularly an alloy in which iron is a substantial or major component. The surface of the metal substrate may be oxidized at elevated temperatures above about 1000° C. to improve the corrosion resistance of the alloy by forming an oxide layer on the surface of the alloy. This oxide layer on the surface of the alloy may also enhance the adherence of a washcoat to the surface of the monolith substrate.

In one embodiment, the substrate may be a monolithic carrier having a plurality of fine, parallel flow passages extending through the monolith. The passages can be of any suitable cross-sectional shape and/or size. The passages may be, for example without limitation, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include, without limitation, woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrate that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter.

Washcoats

According to an embodiment, at least a portion of the catalyst of the present invention may be placed on the substrate in the form of a washcoat. The oxide solids in the washcoat may be one or more carrier material oxide, one or more catalyst, or a mixture of carrier material oxide(s) and catalyst(s). Carrier material oxides are normally stable at high temperatures (>1000° C.) and under a range of reducing and oxidizing conditions. A preferable oxygen storage material is a mixture of ceria and zirconia; more preferably a mixture of (1) ceria, zirconia, and lanthanum or (2) ceria, zirconia, neodymium, and praseodymium.

According to an embodiment, if a catalyst of the present invention comprises at least one oxygen storage material, the catalyst may comprise about 10 to about 90 weight percent oxygen storage material, preferably about 20 to about 80 weight percent, more preferably about 40 to about 75 weight percent. The weight percent of the oxygen storage material is on the basis of the oxides.

Various amounts of any of the washcoats of the present invention may be coupled with a substrate, preferably an amount that covers most of, or all of, the surface area of a substrate. In an embodiment, about 80 g/L to about 250 g/L of a washcoat may be coupled with a substrate.

In an embodiment, a washcoat may be formed on the substrate by suspending the oxide solids in water to form an aqueous slurry and depositing the aqueous slurry on the substrate as a washcoat.

Other components may optionally be added to the aqueous slurry. Other components such as acid or base solutions or various salts or organic compounds may be added to the aqueous slurry to adjust the rheology of the slurry and/or enhance binding of the washcoat to the substrate. Some examples of compounds that can be used to adjust the rheology include, but are not limited to, ammonium hydroxide, aluminum hydroxide, acetic acid, citric acid, tetraethylammonium hydroxide, other tetraalkylammonium salts, ammonium acetate, ammonium citrate, glycerol, commercial polymers such as polyethylene glycol, polyvinyl alcohol and other suitable polymers.

The slurry may be placed on the substrate in any suitable manner. For example, without limitation, the substrate may be dipped into the slurry, or the slurry may be sprayed on the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages can contact the washcoat on the walls of the passages as well as materials that are supported on the washcoat.

It is believed that the oxygen storage material may improve the rheology of the washcoat slurry. Such an improvement may be seen in process control and/or manufacture of the catalyst system. The enhanced rheology of the washcoat slurry that may be due to the presence of the oxygen storage material may enhance the adhesion of the washcoat slurry to the substrate.

Catalyst System Architecture

The catalyst system of the present invention may have one of the following three architectures. In one embodiment, a catalyst system may comprise a substrate (1) and a washcoat (2), wherein the washcoat comprises at least one catalyst. See FIG. 1 (Architecture 1). In another embodiment, a catalyst system may comprise a substrate (1), a washcoat (2), and an overcoat (3), wherein the washcoat (2) and overcoat (3) each comprise at least one catalyst. See FIG. 2 (Architecture 2). In another embodiment, a catalyst system may comprise a substrate (1), a washcoat (2), and an overcoat (3), wherein the overcoat (3) comprises at least one catalyst, but the washcoat (2) is free of catalyst, preferably completely free. See FIG. 3 (Architecture 3). The washcoat (2) of the third catalyst system architecture comprises a carrier material oxide or mixtures thereof. Other components known to one of ordinary skill in the art may be included.

The Architectures depicted in FIGS. 1-3 show how the layers are applied in order, but the end product may not have the layers as depicted due to, without limitation, the reactions that may occur between the layers.

In the event that a washcoat (2) or an overcoat (3) with a catalyst is required, the washcoat (2) may be deposited in three different ways. First, depositing all desired components in one step. Or second, depositing components without a catalyst, then separately depositing at least one impregnation component and heating (this separate deposit is also referred to as an impregnation step). The impregnation component comprises, without limitation, transition metals, alkali and alkaline earth metals, cerium, lanthanum, yttrium, lanthanides, actinides, or mixtures thereof. The impregnation step converts metal salts into metal oxides creating a washcoat (2) comprising a catalyst. Third, depositing all desired components at once, including metal salts and then heating to convert the metals salts to metal oxides.

The overcoat (3) is typically applied after treating the washcoat (2), but treating is not required prior to application of the overcoat (3) in every embodiment. Preferably, the overcoat (3) is applied after the washcoat (2).

According to an embodiment, a catalyst system comprises a substrate (1) and one or more catalyst selected from the group consisting of a ZPGM transition metal catalyst, a mixed metal oxide catalyst, and a zeolite catalyst.

ZPGM Transition Metal Catalyst

According to an embodiment, a catalyst system of the present invention comprises a ZPGM transition metal catalyst. A ZPGM transition metal catalyst comprises one or more transition metals. Preferably the transition metal is copper, nickel, iron, manganese, silver, cobalt, tungsten, niobium, molybdenum, or chromium; more preferably copper, nickel, iron, or manganese; most preferably copper, nickel, or cobalt.

According to an embodiment, the ZPGM transition metal catalyst optionally comprises one or more of a carrier material oxide. Preferably the catalyst comprises a perovskite, a spinel, a lyonsite, an oxygen storage material, alumina, or mixtures thereof; more preferably a spinel, an oxygen storage material, alumina, or mixtures thereof; most preferably at least one spinel and at least one oxygen storage material, or alumina and at least one oxygen storage material.

If a catalyst of the present invention comprises at least one oxygen storage material, the catalyst may comprise about 10 to about 90 weight percent oxygen storage material, preferably about 20 to about 80 weight percent, more preferably about 40 to about 75 weight percent. The weight percent of the oxygen storage material is on the basis of the oxides.

With any of the catalyst systems described herein, the catalysts may optionally further comprise one or more of a transition metal, alkaline earth metal, ceria, and mixtures thereof. Preferably, the transition metal is iron, manganese, or mixtures thereof. Preferably, the alkaline earth metal is magnesium, barium, or mixtures thereof.

According to an embodiment, the catalyst, referred to as "Type H", comprises at least one transition metal and at least one carrier material oxide. The transition metals may be a single transition metal, or a mixture of transition metals which includes, but is not limited to, chromium, manganese, iron, cobalt, nickel, copper, silver, niobium, molybdenum, and tungsten. The preferred transition metals are copper, nickel and cobalt. The total amount of the transition metal(s)

are present in about 5% to about 50% by weight of the total catalyst weight and may be present in any ratio of transitional metals.

According to an embodiment, the catalyst, referred to as "Type D", comprises copper and one or more carrier material oxides. Optionally, additional transition metals may be included. The copper may be applied through impregnation as discussed herein. The copper in the catalyst may be present in about 5% to about 50% by weight, preferably about 5% to about 30%, more preferably about 15% by weight.

According to an embodiment, a catalyst system, referred to as "ZPGM-6", comprises a substrate, a washcoat, and an overcoat. The substrate comprises cordierite. The washcoat comprises a spinel and at least one oxygen storage material, preferably the oxygen storage material is a mixture of cerium, zirconium, and lanthanum. The spinel in this embodiment comprises magnesium aluminum oxides. Additionally, the oxygen storage material and the spinel may be present in the washcoat in a ratio of 40 to about 60 by weight. If an impregnation step is required, copper, cerium, zirconium, and lanthanum may be added and heated to convert metal salts into metal oxides that create a washcoat comprising the catalyst. The overcoat comprises copper oxide, a spinel, and at least one oxygen storage material, preferably the oxygen storage material comprises a mixture of cerium, zirconium, neodymium, and praseodymium. The spinel in this embodiment comprises magnesium aluminum oxides. The spinel and oxygen storage material of the overcoat may be present in the overcoat in a ratio of about 60 to about 40. The copper in the overcoat is present in about 5% to about 50%, preferably about 10% to about 16% by weight.

According to an embodiment, a catalyst system, referred to as "ZPGM-5", comprises a substrate, a washcoat, and an overcoat. The substrate comprises cordierite. The washcoat comprises lanthanum-doped aluminum oxide and at least one oxygen storage material, preferably the oxygen storage material comprises a mixture of cerium, zirconium, neodymium, and praseodymium. Additionally, the oxygen storage material and the lanthanum-doped aluminum oxide may be present in the washcoat in a ratio of about 40 to about 60. The optional impregnation components comprise copper, cerium, zirconium, and lanthanum. The overcoat comprises copper oxide, lanthanum-stabilized aluminum oxide, and at least one oxygen storage material, preferably the oxygen storage material comprises a mixture of cerium, zirconium, neodymium, and praseodymium. The aluminum oxide and oxygen storage material of the overcoat may be present in the overcoat in a ratio of about 75 to about 25. The copper in the overcoat is present in about 5% to about 50%, preferably about 15% by weight.

According to an embodiment, a catalyst system, referred to as "ZPGM-4", comprises a substrate, a washcoat, and an overcoat. The washcoat comprises tin aluminum oxide and at least one oxygen storage material, preferably the oxygen storage material comprises a mixture of cerium, zirconium, neodymium, and praseodymium. The tin aluminum oxide and the oxygen storage material may be present in the washcoat in a ratio of from about 25:75 to about 75:25, preferably in a ratio of about 60 to about 40. The optional impregnation components comprise copper, cerium, zirconium, and lanthanum. The overcoat comprises aluminum, copper, and at least one oxygen storage material, preferably the oxygen storage material comprises a mixture of cerium, zirconium, and lanthanum. The aluminum oxide and oxygen storage material may be present in the overcoat in a ratio of about 60 to about 40. According to an embodiment, there is about 5% to about 30% copper by weight in the overcoat, preferably about 10% to about 20%, more preferably about 12%.

According to an embodiment, a catalyst system, referred to as "ZPGM-3", comprises a substrate and a washcoat. The washcoat comprises copper, tin aluminum oxide, and at least one oxygen storage material, preferably the oxygen storage material comprises a mixture of cerium, zirconium, neodymium, and praseodymium. The tin aluminum oxide and the oxygen storage material may be present in the washcoat in a ratio of about 60 to about 40. If an impregnation step is used, the impregnation components comprise copper, cerium, zirconium, and lanthanum. The cerium, zirconium, and lanthanum may be present in the washcoat in a ratio of about 60 to about 30 to about 10. The washcoat may comprise additional transition metals. According to an embodiment, there is about 5% to about 30% copper by weight in the washcoat, preferably about 10% to about 20%, more preferably about 12%.

According to an embodiment, a catalyst system, referred to as "ZPGM-2", comprises a substrate and a washcoat. The washcoat may comprise, without limitation, copper, aluminum oxide, and at least one oxygen storage material, preferably the oxygen storage material is a mixture of cerium, zirconium, and lanthanum. The aluminum oxide and the oxygen storage material may be present in the washcoat in a ratio of about 60 to about 40. The copper in the washcoat may be about 5% to about 20% copper by weight, preferably about 8%. The washcoat coat may optionally comprise additional transitional metals and/or ceria.

According to an embodiment, a catalyst system, referred to as "ZPGM-1", comprises a substrate and a washcoat. The washcoat comprises at least one carrier material oxide and a perovskite; preferably the carrier material oxide comprises an oxygen storage material, more preferably comprises one or more selected from the group consisting of cerium, zirconium, lanthanum, neodymium, praseodymium, and mixtures thereof; and the perovskite preferably is a mixture of cerium, lanthanum, manganese and copper, having the specific formula $Ce_{0.6}La_{0.4}Mn_{0.6}Cu_{0.4}O_3$.

According to an embodiment, the catalyst, referred to as "Type A", comprises at least one transition metal, at least one alkaline earth metal, cerium, and at least one carrier material oxide. The transition metal, alkaline earth metal and cerium are present in about 5% to about 50% by weight in any ratio of the three components. Preferably, the alkaline earth metals comprise one or more selected from the group consisting of magnesium, calcium, barium, and strontium. The transition metals may be a single transition metal, or a mixture of transition metals which include, but is not limited to, chromium, manganese, iron, cobalt, nickel, copper, niobium, molybdenum, and tungsten.

According to an embodiment, the catalyst, referred to as "Type C", comprises at least one transition metal, at least one alkaline earth metal, and at least one carrier material oxide. The transition metal may be a single transition metal, or a mixture of transition metals which include, but is not limited to, chromium, manganese, iron, cobalt, nickel, copper, niobium, molybdenum, tungsten, and silver. The alkaline earth metal may be, but is not limited to, magnesium, calcium, barium or strontium. The preferred transition metals are copper, nickel, and cobalt, while the preferred alkaline earth metals are barium and strontium. The alkaline earth metal and the transition metal may be present in a molar ratio of about 1:10 to 1:1 and at about 2% to about 50% weight of the catalyst.

According to an embodiment, the catalyst, referred to as "Type E", comprises at least one transition metal and a perovskite having the formula $ABO_3$. The transition metal may be, but is not limited to, copper, nickel, cobalt, manganese, iron, chromium, niobium, molybdenum, tungsten, and silver. Preferably, the transition metals are copper, nickel, and/or cobalt. "A" comprises lanthanum, cerium, magnesium, calcium, barium, strontium, lanthanides, actinides, or a mixture thereof. "B" comprises iron, manganese, copper, nickel, cobalt, cerium, or mixtures thereof. The transition metal(s) is present in about, 2% to about 30% by weight.

According to one embodiment, the Type E catalyst comprises a perovskite ($ABO_3$), at least one transition metal, and at least one a carrier material oxide. The transition metal may be a single transition metal, or a mixture of transition metals which includes, but is not limited to, chromium, manganese, iron, cobalt, nickel, copper, niobium, molybdenum, tungsten, silver, or mixtures thereof. The perovskite and transition metal are present in about 5% to about 50% by weight.

According to an embodiment, the catalyst, referred to as "Type G", comprises at least one transition metal and a spinel having the formula $AB_2O_4$. The transition metal may be, but is not limited to, copper, nickel, cobalt, manganese, iron, chromium, niobium, molybdenum, tungsten, and silver. The preferred transition metals include, copper, nickel, and cobalt; more preferably copper. "A" and "B" each comprise aluminum, magnesium, manganese, gallium, nickel, copper, cobalt, iron, chromium, niobium, titanium, tin, or mixtures thereof. A preferred spinel is $MgAl_2O_4$. The transition metal(s) are present in about 2% to about 30% by weight.

According to one embodiment, the Type G catalyst comprises a spinel ($AB_2O_4$), a transition metal, and a carrier material oxide. The transition metal may be a single transition metal, or a mixture of transition metals which includes, but is not limited to, chromium, manganese, iron, cobalt, nickel, copper, niobium, molybdenum, tungsten, and/or silver. A preferred spinel is $MgAl_2O_4$. The spinel and transition metal(s) are present in about 5% to about 50% by weight.

Mixed Metal Oxide Catalyst

According to an embodiment, a catalyst may be a mixed metal oxide catalyst, which comprises at least one transition metal and at least one other metal. The other metals of the mixed metal oxide may include, but are not limited to alkali and alkaline earth metal, lanthanides, or actinides. For example, the mixed metal oxide may be a spinel, a perovskite, a delafossite, a lyonsite, a garnet, or a pyrochlore.

According to an embodiment, the catalyst, referred to as "Type B", comprises a perovskite having the formula $ABO_3$ or a related structure with the general formula $A_{a-x}B_xMO_b$, wherein "a" is 1 or 2, "b" is 3 when "a" is 1 or "b" is 4 when "a" is 2, and "z" is a number defined by $0.1 \leq x < 0.7$. "A" comprises lanthanum, lanthanides, actinides, cerium, magnesium, calcium, barium, strontium, or mixtures thereof. "B" comprises a single transition metal, or a mixture of transition metals including but not limited to iron, manganese, copper, nickel, cobalt, and cerium, or mixture thereof. According to an embodiment, the catalyst may have the formula $AMn_{1-x}Cu_xO_3$, wherein "A" is lanthanum, cerium, barium, strontium, a lanthanide, or an actinide and "x" is 0 to 1.

According to another embodiment, the Type B catalyst may have the formula $ACe_{1-x}Cu_xO_3$, wherein "A" is barium, strontium, or calcium, and "x" is 0 to 1. According to an embodiment, about 10 g/L to about 180 g/L of the formula $ABO_3$ may be coupled with the substrate.

According to one embodiment, the Type B catalyst comprises a perovskite ($ABO_3$) or related structure (with general formula $A_{a-x}B_xMO_b$) and one or more of a carrier material oxide. The perovskite or related structure is present in about 5% to about 50% by weight.

According to an embodiment, the catalyst, referred to as "Type F", comprises a spinel having the formula $AB_2O_4$. "A" and "B" of the formula is aluminum, magnesium, manganese, gallium, nickel, copper, cobalt, iron, chromium, titanium, tin, or mixtures thereof.

According to an embodiment, the Type F catalyst comprises a spinel and a carrier material oxide. The spinel is present in about 5% to about 50% by weight.

Zeolite Catalyst

According to an embodiment, a catalyst may be a zeolite catalyst comprising a zeolite or mixture of zeolites and at least one transition metal. A zeolite is mixed aluminosilicates with regular interconnected pores. The zeolite includes, but is not limited to ZSM5, heulandite, chabazite, or mixtures thereof, preferably ZSM5. According to an embodiment, the catalyst, referred to as "Type I" comprises at least one transition metal impregnated into a zeolite or mixtures of zeolite. The transition metal(s) may be a single transition metal or a mixture of transition metal which includes, but is not limited to, chromium, gallium, manganese, iron, cobalt, nickel, copper, niobium, molybdenum, tungsten, and silver. Preferably, the transition metals are selected from the group consisting of copper, nickel, gallium, cobalt, and mixtures thereof. The transition metals may be present in about 3% to about 25% by weight in any ratio of transition metals.

According to an embodiment, the catalysts of the present invention may reduce pollutants emitted from exhaust. This is done by passing exhaust substantially through a catalyst system, such that the flowing exhaust reduces the pollutants. The exhaust includes, but is not limited to exhaust from an automobile, vehicle, factory, train, airplane, building, and laboratory. Pollutants are any compounds, substances, gases, or waste that causes damage to water, air, land, and any other part of the environment, including carbon monoxide, hydrocarbons, nitrogen oxides, and sulfur.

The catalysts of the present invention to decrease the amount of nitrogen oxide emissions. For example: $NO + \frac{1}{2}O_2 \rightarrow NO_2$ and $6NO_2 + 8NH_3 \rightarrow 7N_2 + 12H_2O$. The catalyst also decreases the amount of the unburned hydrocarbons and carbon monoxide by oxidizing them. For example: $2C_xH_y + (2x+y/2)O_2 \rightarrow 2xCO_2 + yH_2O$ or $2CO + O_2 \rightarrow 2CO_2$. The catalysts may also decrease the amount of sulfur emissions.

According to an embodiment, a catalyst system comprises a first catalyst system and a second catalyst system. The first catalyst system may be any catalyst described herein. The second catalyst system comprises a catalyst comprising at least one platinum group metal, wherein the catalyst may comprise any platinum group metal known in the art, including, but not limited to mixtures of platinum group metals and carrier material oxides. The first catalyst system and the second catalyst system may be in an orientation such that a gas stream is capable of passing through the first catalyst system followed by the second catalyst system in series or vice versa. Further, a catalyst system may comprise more than a first and a second catalyst system, e.g. a third catalyst system.

Preparation of a Zero Platinum Group Metal Catalyst by Impregnation

A washcoat having the properties discussed herein may be prepared by methods well known in the art. The washcoat may comprise any of the catalysts and/or additional components described herein. The washcoat is deposited on a substrate and is treated. The treating is done at a temperature between 300° C. and 700° C., preferably about 550° C. The treating may last from about 2 to about 6 hours, preferably about 4 hours. After the washcoat and the substrate are treated, they are cooled to about room temperature. After the washcoat and the substrate are cooled, the washcoat is impregnated with at least one impregnation component. The impregnation component includes, without limitation, a transition-metal salt or salts being dissolved in water and impregnated on the washcoat. Following the impregnation step, the washcoat with the impregnation components are treated. The treating may be performed at about 300° C. to about 700° C., preferably about 550° C. The treating may last from about 2 to about 6 hours, preferably about 4 hours.

According to an embodiment, the substrate, the washcoat, and the impregnation components may be treated to form the catalyst composition before or after the washcoat and/or the impregnation components are added to the substrate. In an embodiment, the washcoat and the impregnation component may be treated before coating.

The impregnation method may be performed on an overcoat. After depositing the overcoat, the overcoat is impregnated with at least one impregnation component. The impregnation component includes, without limitation, a transition-metal salt or salts being dissolved in water and impregnated on the overcoat. Following the impregnation step, the overcoat with the impregnation components are treated. The treating may be performed at about 300° C. to about 700° C., preferably about 550° C. The treating may last from about 2 hours to about 6 hours, preferably about 4 hours.

Preparation of a Zero Platinum Group Metal Catalyst by Precipitation

The method of precipitation includes precipitating a transition metal salt or salts on a washcoat. The transition metal salt or salts may be precipitated with, but is not limited to $NH_4OH$, $(NH_4)_2CO_3$, tetraethylammonium hydroxide, other tetraalkylammonium salts, ammonium acetate, or ammonium citrate. The washcoat may be any washcoat described herein. Next, the precipitated transition metal salt or salts and washcoat are treated. The treating may be from about 2 hours to about 24 hours. Next, the precipitated transition metal salt or salts and the washcoat are deposited on a substrate followed by treating for about 2 hours to about 6 hours, preferably about 4 hours at a temperature of about 300° C. to about 700° C., preferably about 550° C. Optionally, after treating, an overcoat may be deposited on the treated precipitated transition metal salt or salts and washcoat and treated again. The overcoat may be treated for about 2 hours to about 6 hours, preferably about 4 hours and at a temperature of about 300° C. to about 700° C., preferably about 550° C.

Preparation of a Zero Platinum Group Metal Catalyst by Co-Milling

A catalyst and a carrier material oxide are milled together. The catalyst can be synthesized by any chemical technique such as, but not limited to solid-state synthesis, precipitation, or any other technique known in the art. The milled catalyst and carrier material oxide are deposited on a substrate in the form of a washcoat and then treated. The treatment may be from about 2 hours to about 6 hours, preferably about 4 hours and at a temperature of about 300° C. to about 700° C., preferably about 550° C. Optionally, an overcoat may be deposited on the treated catalyst after cooling to about room temperature. The overcoat, washcoat and substrate are treated for about 2 hours to about 6 hours, preferably about 4 hours and at a temperature of 300° C. to about 700° C., preferably about 550° C.

The following examples are intended to illustrate, but not to limit, the scope of the invention. It is to be understood that other procedures known to those skilled in the art may alternatively be used.

EXAMPLE 1

Pore Volume and Surface Area Measurements for Zero Platinum Group Metal Catalysts FIG. 4 shows the measured pore volume for the fresh catalyst systems ZPGM-1 through ZPGM-5 and FIG. 5 shows the measured pore volume for the aged catalyst systems ZPGM-1 through ZPGM-5. The aged catalyst systems were aged at 950° C. for 16 hours with 10% $H_2O$ and air. The y-axis on the right side of FIG. 4 is for the pore volume ($cm^3/g$) of ZPGM-1 only.

The pore volumes were measured using a Micromeritics® (Norcross, Ga.) TriStar 3000 gas adsorption analyzer at 77K. The pore volumes were obtained from the nitrogen adsorption isotherms using the Barrett-Joiner-Halenda (BJH) method (E. P. Barrett, L. G. Joyner, P. P. Halenda, "The determination of pore volume and area distributions in porous substances. I. Computations from nitrogen isotherms," J. Am. Chem. Soc. (1951), 73, 373-380).

The results in FIGS. 4 and 5 show that the pore volume decreases for all the catalyst systems (ZPGM-1 through ZPGM-5) upon aging. The average pore volume for the fresh ZPGM-1 decreases from 0.106 $cm^3/g$ to 0.017 $cm^3/g$ for the aged catalyst. Similarly, the average pore volume for the fresh ZPGM-2 decreases from 0.173 $cm^3/g$ to 0.116 $cm^3/g$ for the aged catalyst. Again, the average pore volume for the fresh ZPGM-3 decreases from 0.107 $cm^3/g$ to 0.010 $cm^3/g$ for the aged catalyst. The average pore volume for the fresh ZPGM-4 decreases from 0.190 $cm^3/g$ to 0.142 $cm^3/g$ for the aged catalyst. The average pore volume for the fresh ZPGM-5 decreases from 0.213 $cm^3/g$ to 0.122 $cm^3/g$ for the aged catalyst.

EXAMPLE 2

Surface Area Analysis for Fresh and Aged Catalyst Systems ZPGM-1 Through ZPGM-5

The surface areas for the fresh and aged ZPGM catalyst systems are presented in FIG. 6. The aged catalyst systems were aged at 950° C. for 16 hours with 10% $H_2O$ and air.

The surface areas were measured using a Micromeritics® (Norcross, Ga.) TriStar 3000 gas adsorption analyzer at 77K. The surface areas were calculated using the BET (Brunauer, Emmitt and Teller) method (S. Brunauer, P. H. Emmett and E. Teller, J. Am. Chem. Soc., 1938, 60, 309).

The results in FIG. 6 show that the surface area decreases for all catalyst systems (ZPGM-1 through ZPGM-5) upon aging. The surface area decreases from 18.72 $m^2/g$ for the fresh ZPGM-1 to 2.76 $m^2/g$ for the aged catalyst. Similarly, the surface area decreases from 38.60 $m^2/g$ for the fresh ZPGM-2 to 15.48 $m^2/g$ for the aged catalyst. The surface area decreases from 30.78 $m^2/g$ for the fresh ZPGM-3 to 16.71 $m^2/g$ for the aged catalyst. The surface area decreases from 46.95 $m^2/g$ for the fresh ZPGM-4 to 22.06 $m^2/g$ for the aged catalyst. The surface area decreases from 53.45 $m^2/g$ for the fresh ZPGM-5 to 24.02 $m^2/g$ for the aged catalyst.

EXAMPLE 3

X-Ray Diffraction Analysis for ZPGM Transition Metal Catalysts

FIG. 7-12 show the X-ray diffraction (XRD) patterns of fresh and aged catalyst systems ZPGM-1 through ZPGM-6; the aged catalyst systems were aged at 950° C. for 16 hrs with 10% $H_2O$ and air.

The XRD analysis was conducted to determine the crystalline phases present for each catalyst system. The XRD patterns were measured on a Rigaku® powder diffractometer (MiniFlex™) using Cu Kα radiation in the 2-theta range of 20-70° with a step size of 0.05° and a dwell time of 2 s. The tube voltage and current were set at 40 kV and 30 mA, respectively. The resulting diffraction patterns were analyzed using the International Centre for Diffraction Data (ICDD) database.

FIG. 7 shows the XRD spectra of the fresh and aged ZPGM-1 catalyst system, $Ce_{0.6}La_{0.4}Mn_{0.6}Cu_{0.4}O_3$, shows the presence of the perovskite (open circles) and fluorite (filled squares) structures. The fluorite and the perovskite structures are larger in the aged sample as evidenced by the sharper peaks.

FIG. 8 shows the XRD patterns of fresh and aged ZPGM-2 catalyst system, 8% Cu impregnated on $Al_2O_3$+$Ce_{0.64}Zr_{0.21}La_{0.15}O_2$ (60:40 weight ratio of $Al_2O_3$ to $Ce_{0.64}Zr_{0.21}La_{0.15}O_2$) (160 g/ml). The XRD spectrum of the fresh ZPGM-2 catalyst system shows the presence of the fluorite structure (open squares), alumina (A) and CuO (filled circles). The aged ZPGM-2 catalyst system shows fluorite (open squares), $CuAl_2O_4$ (filled diamonds) and alumina (A). The fluorite structure is larger in the aged sample as evidenced by the sharper peaks.

FIG. 9 shows the XRD patterns of fresh and aged ZPGM-3 catalyst system, 8% Cu+6.1% Ce+2.4% Zr+1.5% La impregnated on 15% Sn—$Al_2O_3$+$Ce_{0.6}Zr_{0.3}Nd_{0.05}Pr_{0.05}O_2$ (60:40 weight ratio of Sn—$Al_2O_3$ to $Ce_{0.6}Zr_{0.3}Nd_{0.05}Pr_{0.05}O_2$) (200 g/L). The XRD spectrum of the fresh ZPGM-3 catalyst system shows the presence of the fluorite structure (open circles), $ZrO_2$ (open squares), alumina (A) and CuO (filled circles). The aged ZPGM-3 catalyst system shows fluorite (open circles), $ZrO_2$ (open squares), $SnO_2$ (filled circles), $CuAl_2O_4$ (filled diamonds) and alumina (A). The cordierite peak in the aged sample is from the substrate. During the aging the tin oxide dissociates from the alumina, the Cu reacts with the $Al_2O_3$ to form $CuAl_2O_4$.

FIG. 10 shows the XRD patterns of fresh and aged ZPGM-4 catalyst system, which is composed of an overcoat containing 12% Cu impregnated on $Ce_{0.6}Zr_{0.21}La_{0.15}O_2$+$Al_2O_3$ (60:40 weight ratio of $Ce_{0.6}Zr_{0.21}La_{0.15}O_2$ to $Al_2O_3$) and a washcoat containing 8% Cu+6.1% Ce+2.4% Zr+1.5% La impregnated on 15% Sn—$Al_2O_3$+$Ce_{0.6}Zr_{0.3}Nd_{0.05}Pr_{0.05}O_2$ (60:40 weight ratio of Sn—$Al_2O_3$ to $Ce_{0.6}Zr_{0.3}Nd_{0.05}Pr_{0.05}O_2$). The XRD spectrum of the fresh ZPGM-4 catalyst system shows the presence of the fluorite structure (filled circles), $CeO_2$ (open squares), alumina (A) and CuO (filled squares). The aged ZPGM-4 catalyst system shows fluorite (filled circles), $CeO_2$ (open squares), $SnO_2$ (open circles), $CuAl_2O_4$ (filled diamonds) and alumina (A). During the aging the tin oxide dissociates from the alumina, the Cu reacts with the $Al_2O_3$ to form $CuAl_2O_4$.

FIG. 11 shows the XRD patterns of fresh and aged ZPGM-5 catalyst system, which is composed of an overcoat containing 12.4% CuO impregnated on La—$Al_2O_3$+$Ce_{0.6}Zr_{0.3}Nd_{0.05}Pr_{0.05}O_2$ (25:75 weight ratio of La—$Al_2O_3$ to $Ce_{0.6}Zr_{0.3}Nd_{0.05}Pr_{0.05}O_2$) (65 g/L) and a washcoat containing 8% Cu+6.1% Ce+2.4% Zr+1.5% La impregnated on La—$Al_2O_3$+$Ce_{0.6}Zr_{0.3}Nd_{0.05}Pr_{0.05}O_2$ (60:40 weight ratio of La—$Al_2O_3$ to $Ce_{0.6}Zr_{0.3}Nd_{0.05}Pr_{0.05}O_2$) (180 g/L). The XRD spectrum of the fresh ZPGM-5 catalyst system shows the presence of the fluorite structure (filled circles) and alumina (A). The aged ZPGM-5 catalyst system shows fluorite (filled circles), $CuAl_2O_4$ (filled diamonds) and alumina (A). During the aging the Cu reacts with the $Al_2O_3$ to form $CuAl_2O_4$.

FIG. 12 shows the XRD patterns of fresh and aged ZPGM-6 catalyst system, which is composed of an overcoat containing 10% Cu+12% Ce impregnated on $MgAl_2O_4$+16% Cu impregnated on $Ce_{0.6}Zr_{0.3}Nd_{0.05}Pr_{0.05}O_2$ (60:40 weight ratio of Ce impregnated on $MgAl_2O_4$ to 16% Cu impregnated on $Ce_{0.6}Zr_{0.3}Nd_{0.05}Pr_{0.05}O_2$) (65 g/L) and a washcoat containing 4% Cu+6.1% Ce+2.4% Zr+1.5% La impregnated on $MgAl_2O_4$+$Ce_{0.64}Zr_{0.21}La_{0.15}O_2$ (60:40 weight ratio of $MgAl_2O_4$ to $Ce_{0.64}Zr_{0.21}La_{0.15}O_2$) (180 g/L). The XRD spectrum of the fresh ZPGM-6 catalyst system shows the presence of two fluorite structures (filled and open circles), and $MgAl_2O_4$ (open diamonds). The aged ZPGM-6 catalyst system shows two fluorite structures (filled and open circles), $MgAl_2O_4$ (open diamonds), $CuAl_2O_4$ (filled diamonds), and CuO (filled squares). During the aging the CZL and CuO became more crystalline, and some $CuAl_2O_4$ formed.

EXAMPLE 4

Sweep Test for Catalyst Systems ZPGM-1 Through ZPGM-6

FIGS. 13-18 show the sweep test results for catalyst systems ZPGM-1, through ZPGM-6 (as described above in Examples 3-8), respectively. The sweep test was performed with an inlet temperature of 600° C., an air/fuel span of ±0.2 and a cycle frequency of 1 Hz. A sweep test indicates the catalyst performance at various R-values (moles of reductant divided by moles of oxidant). High conversions over a large range of R-values indicate a promising catalyst because it can perform well under rich (R-values>1) and lean (R-values<1) engine conditions. The aged catalyst systems were aged at 1050° C. for 10 hrs cycling between a 56 second rich segment and a 4 second lean segment.

FIG. 13 shows the sweep test results for the fresh and aged ZPGM-1 catalyst system. The sweep results for the fresh catalyst show that the CO conversion decreases with R-values>1.05, while the hydrocarbon (HC) conversion decreases with increasing R-values. The NO conversion increases with R-value>0.85. The catalytic properties for CO, hydrocarbons and NO decrease after aging; the NO conversion is <5% over the entire R-value range tested. The CO conversion of the aged ZPGM-1 decreases with increasing R-value. The HC conversion for the aged ZPGM-1 is best for R-values between 0.95 and 1.05.

FIG. 14 shows the sweep test results for the fresh and aged ZPGM-2 catalyst system. The sweep results for the fresh catalyst show that the CO conversion decreases with R-values>1.05, while the hydrocarbon (HC) conversion decreases with increasing R-values. The NO conversion increases with R-value>0.85. The catalytic properties for CO, hydrocarbons and NO decrease after aging. The CO and HC conversions of the aged ZPGM-2 decrease with increasing R-value. The NO conversion is the highest at R=0.85, for the aged ZPGM-2 catalyst system.

FIG. 15 shows the sweep test results for the fresh and aged ZPGM-3 catalyst system. The sweep results for the fresh catalyst show that the CO conversion decreases with R-values>1.05, while the hydrocarbon (HC) conversion decreases with increasing R-values. The NO conversion increases with increasing R-values. The catalytic properties for CO, hydrocarbons and NO decrease after aging. The CO and HC conversions of the aged ZPGM-3 decrease with increasing R-value. The NO conversion for the aged ZPGM-3 increases with R-values>0.95.

FIG. 16 shows the sweep test results for the fresh and aged ZPGM-4 catalyst system. The sweep results for the fresh catalyst show that the CO conversion decreases with R-values>0.975, while the hydrocarbon (HC) conversion decreases with increasing R-values. The NO conversion increases with increasing R-values. The catalytic properties for CO, hydrocarbons and NO decrease after aging. The CO and HC conversions of the aged ZPGM-4 decrease with increasing R-value. The NO conversion for the aged ZPGM-4 increases with R-values>0.95.

FIG. 17 shows the sweep test results for the fresh and aged ZPGM-5 catalyst system. The sweep results for the fresh catalyst show that the CO conversion decreases with R-values>0.975, while the hydrocarbon (HC) conversion decreases with increasing R-values. The NO conversion increases with increasing R-values. The catalytic properties for CO, hydrocarbons and NO decrease after aging. The CO and HC conversions of the aged ZPGM-5 decrease with increasing R-value. The NO conversion for the aged ZPGM-5 increases with R-values>1.05.

FIG. 18 shows the sweep test results for the fresh and aged ZPGM-6 catalyst system. The sweep results for the fresh catalyst show that the CO conversion decreases with R-values>0.975, while the hydrocarbon (HC) conversion decreases with increasing R-values. The NO conversion increases with increasing R-values. The catalytic properties for CO, hydrocarbons and NO decrease after aging. The CO and HC conversions of the aged ZPGM-6 decrease with increasing R-value. The NO conversion for the aged ZPGM-6 increases with R-values>0.975.

EXAMPLE 5

Light-Off Test for Type D or Type H ZPGM Transition Metal Catalysts

FIGS. 19-21 show the light-off test results for examples of Type D or Type H ZPGM Transition Metal Catalysts. It should be noted that a catalyst may fall into one or more types, such as here, where the catalyst is both Type D and Type H. A light-off test was performed on aged (800° C. for 16 hours, composed of a 56 second rich segment and a 4 second lean segment) catalysts of the present invention. The test was performed by increasing the temperature from about 100° C. to 640° C. at R-value=1.05 and R-value=1.5. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 19 shows the results for Type D/H catalyst with a composition of 16% Cu/$Ce_{0.3}Zr_{0.6}Nd_{0.05}Pr_{0.05}O_2$. It should be noted that a catalyst may fall into one or more types, such as here, where the catalyst is both Type D and Type H. The light-off test at R=1.05 shows that the catalyst has $T_{50}$ for CO at 267° C. and a $T_{50}$ for HC at 525° C. The maximum conversion for NO is about 2% at 640° C. Increasing the R-value to 1.5 improves the NO conversion, but the CO and HC performance deteriorates. The light-off test at R=1.5 shows that the catalyst has $T_{50}$ s for CO and HC decrease to 323° C. and 595° C., respectively. The NO light-off at R=1.5 shows a $T_{50}$ of 494° C.

FIG. 20 shows the results for Type D/H catalyst with a composition of 12% Cu/$Ce_{0.6}Zr_{0.3}La_{0.1}O_2$. It should be noted that a catalyst may fall into one or more types, such as here, where the catalyst is both Type D and Type H. The light-off test at R=1.05 shows that the catalyst has $T_{50}$ for CO at 237° C. and a $T_{50}$ for HC at 543° C. The maximum conversion for NO is about 4% at 640° C. Increasing the R-value to 1.5 improves the NO conversion, but the CO and HC performance deteriorates. The light-off test at R=1.5 shows that the catalyst has $T_{50}$ s for CO and HC decrease to 329° C. and 611° C., respectively. The NO light-off at R=1.5 shows a $T_{50}$ of 515° C.

FIG. 21 shows the results for Type D/H catalyst with a composition of 10% Cu+12% Ce/La—$Al_2O_3$. It should be noted that a catalyst may fall into one or more types, such as here, where the catalyst is both Type D and Type H. The light-off test at R=1.05 shows that the catalyst has $T_{50}$ for CO at 298° C. and a $T_{50}$ for HC at 546° C. The maximum conversion for NO is about 3% at 640° C. Increasing the R-value to 1.5 improves the NO conversion, but the CO and HC performance deteriorates. The light-off test at R=1.5 shows that the catalyst has $T_{50}$ s for CO and HC decrease to 325° C. and 598° C., respectively. The NO light-off at R=1.5 shows a $T_{50}$ of 461° C.

EXAMPLE 6

Light-Off Test for Type F ZPGM Transition Metal Catalysts

FIGS. 22-24 show the light-off test results for examples of Type F catalyst. A light-off test was performed on aged (800° C. for 16 hours, composed of a 56 second rich segment and a 4 second lean segment) catalysts of the present invention. The test was performed by increasing the temperature from about 100° C. to 640° C. at R-value=1.05 and R-value=1.5. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 22 shows the results for Type F catalyst with a composition of $CuLa_{0.04}Al_{1.96}O_4$. The light-off test at R=1.05 shows that the catalyst has $T_{50}$ for CO at 334° C. The maximum conversions for NO and HC at 640° C. are about 6% and 38%, respectively. Increasing the R-value to 1.5 improves the NO conversion, but the CO and HC performance deteriorates. The light-off test at R=1.5 shows that the catalyst has $T_{50}$ for CO decreases to about 453° C. The NO light-off at R=1.5 shows a $T_{50}$ of 521° C. While, the maximum conversion for HC is about 16% at 640° C.

FIG. 23 shows the results for Type F catalyst with a composition of $Cu_{0.5}Fe_{0.5}La_{0.04}Al_{1.96}O_4$. The light-off test at R=1.05 shows that the catalyst has $T_{50}$ for CO at 346° C. and a $T_{50}$ for HC at 535° C. The maximum NO conversion is about 1% at 640° C. Increasing the R-value to 1.5 improves the NO conversion, but the CO and HC performance deteriorates. The light-off test at R=1.5 shows that the catalyst has $T_{50}$ for CO and HC decrease to 368° C. and 588° C., respectively. The NO light-off at R=1.5 shows a $T_{50}$ of 491° C.

FIG. 24 shows the results for Type F catalyst with a composition of $CuLa_{0.04}Al_{1.47}Mn_{0.49}O_4$. The light-off test at R=1.05 shows that the catalyst has $T_{50}$ for CO at 371° C. The maximum conversions for NO and HC at 640° C. are about 2% and 27%, respectively. Increasing the R-value to 1.5 improves the NO conversion, but the CO and HC performance deteriorates. The light-off test at R=1.5 shows that the catalyst has $T_{50}$ for CO decreases to about 479° C. While, the maximum conversions for NO and HC are each about 16% at 640° C.

EXAMPLE 7

Light-Off Test for Type G ZPGM Transition Metal Catalysts

FIGS. 25-28 show the light-off test results for examples of Type G/Type D catalyst. It should be noted that a catalyst may fall into one or more types, such as here, where the catalyst is both Type G and Type D. A light-off test was performed on aged (800° C. for 16 hours, composed of a 56 second rich segment and a 4 second lean segment) catalysts of the present invention. The test was performed by increasing the temperature from about 100° C. to 640° C. at R-value=1.05 and R-value=1.5. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 25 shows the results for Type G/Type D catalyst with a composition of 10% Ag/$Cu_{0.5}Fe_{0.5}La_{0.04}Al_{1.96}O_4$. It should be noted that a catalyst may fall into one or more types, such as here, where the catalyst is both Type G and Type D. The light-off test at R=1.05 shows that the catalyst has $T_{50}$ for CO at 383° C. The maximum conversions for NO and HC at 640° C. are about 1% and 33%, respectively. Increasing the R-value to 1.5 improves the NO conversion, but the CO and HC performance deteriorates. The light-off test at R=1.5 shows that the catalyst has $T_{50}$ for CO decreases to about 394° C. The NO light-off at R=1.5 shows a $T_{50}$ of 485° C. While, the maximum conversion for HC is about 16% at 640° C.

FIG. 26 shows the results for Type G/Type D catalyst with a composition of 10% Cu/$CuLa_{0.04}Al_{1.96}O_4$. It should be noted that a catalyst may fall into one or more types, such as here, where the catalyst is both Type G and Type D. The light-off test at R=1.05 shows that the catalyst has $T_{50}$ for CO at 272° C. and a $T_{50}$ for HC at 464° C. There is no measured NO conversion up to 640° C. Increasing the R-value to 1.5 improves the NO conversion, but the CO and HC performance deteriorates. The light-off test at R=1.5 shows that the catalyst has $T_{50}$ s for CO and HC decrease to 375° C. and 565° C., respectively. The NO light-off at R=1.5 shows a $T_{50}$ of 500° C.

FIG. 27 shows the results for Type G/Type D catalyst with a composition of 20% CuO/$MgLa_{0.04}Al_{1.96}O_4$. It should be noted that a catalyst may fall into one or more types, such as here, where the catalyst is both Type G and Type D. The light-off test at R=1.05 shows that the catalyst has $T_{50}$ for CO at 305° C. and a $T_{50}$ for HC at 513° C. The maximum NO conversion is about 1% at 640° C. Increasing the R-value to 1.5 improves the NO conversion, but the CO and HC performance deteriorates. The light-off test at R=1.5 shows that the catalyst has $T_{50}$ s for CO and HC decrease to 412° C. and 587° C., respectively. The NO light-off at R=1.5 shows a $T_{50}$ of 478° C.

FIG. 28 shows the results for Type G/Type D catalyst with a composition of 10% Cu+12% Ce/$MgLa_{0.04}Al_{1.96}O_4$. It should be noted that a catalyst may fall into one or more types, such as here, where the catalyst is both Type G and Type D. The light-off test at R=1.05 shows that the catalyst has $T_{50}$ for CO at 302° C. and a $T_{50}$ or HC at 506° C. The maximum NO conversion is about 2% at 640° C. Increasing the R-value to 1.5 improves the NO conversion, but the CO and HC performance deteriorates. The light-off test at R=1.5 shows that the catalyst has $T_{50}$ s for CO and HC decrease to 338° C. and 585° C., respectively. The NO light-off at R=1.5 shows a $T_{50}$ of 461° C.

EXAMPLE 8

Light-Off Test for Type D ZPGM Transition Metal Catalysts

FIG. 29 shows the light-off test results for an example of Type D catalyst. A light-off test was performed on aged (800° C. for 16 hours, composed of a 56 second rich segment and a 4 second lean segment) catalysts of the present invention. The test was performed by increasing the temperature from about 100° C. to 640° C. at R-value=1.05 and R-value=1.5. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 29 shows the results for Type D catalyst with a composition of 12% CuO/($Ce_{0.6}Zr_{0.3}La_{0.1}O_2$+$MgLa_{0.04}Al_{1.96}O_4$ (40:60)). The light-off test at R=1.05 shows that the catalyst has $T_{50}$ s for CO at 258° C., for HC at 381° C., and for NO at 519° C. Increasing the R-value to 1.5 improves the NO conversion, but the CO and HC performance deteriorates. The light-off test at R=1.5 shows that the catalyst has $T_{50}$ s for CO and HC decrease to 316° C. and 464° C., respectively. The NO light-off at R=1.5 shows a $T_{50}$ of 375° C.

EXAMPLE 9

Light-Off Test for Type I Zeolite Catalyst

FIG. 30 shows the light-off test results for an example of Type I Zeolite catalyst. A light-off test was performed on a fresh catalyst of the present invention. The test was performed by increasing the temperature from about 100° C. to 640° C. at R-value=1.05. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 30 shows the results for Type I catalyst with a composition of 5% Ga+8% Cu/(ZSM-5). The light-off test at R=1.05 shows that the catalyst has $T_{50}$ s for CO at 376° C., for HC at 319° C., and for NO at 343° C.

EXAMPLE 10

Light-Off Test for Architecture Type 3, which Comprises a Substrate, a Washcoat, and an Overcoat, Wherein the Overcoat Comprises at Least One Catalyst, but the Washcoat does not FIG. 31 shows the light-off test results for an example of Architecture Type 3 Catalyst, which comprises a substrate, a washcoat, and an overcoat, wherein the overcoat comprises at least one catalyst, but the washcoat does not (washcoat comprises La—$Al_2O_3$+$Ce_{0.6}Zr_{0.3}Nd_{0.05}Pr_{0.05}O_2$; 60:40; 100 g/L and overcoat comprises 12% Cu on $Ce_{0.6}Zr_{0.3}Nd_{0.05}Pr_{0.05}O_2$, 150 g/L). A light-off test was performed on aged (800° C. for 16 hours, composed of a 56 second rich segment and a 4 second lean segment) catalysts of the present invention. The test was performed by increasing the temperature from about 100° C. to 640° C. at R-value=1.05 and R-value=1.5. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

The light-off test at R=1.05 shows that the catalyst has $T_{50}$ for CO at 314° C. and a $T_{50}$ for HC at 464° C. The maximum NO conversion is about 6% at 640° C. Increasing the R-value to 1.5 improves the NO conversion, but the HC performance deteriorates. The light-off test at R=1.5 shows that the catalyst has $T_{50}$ s for CO and HC decrease to 316° C. and 566° C., respectively. The NO light-off at R=1.5 shows a $T_{50}$ of 453° C.

EXAMPLE 11

Light-Off Test for Catalyst Systems ZPGM-1 Through ZPGM-6 (Fresh and Aged)

FIGS. 32-37 show the light-off test results for ZPGM-1 through ZPGM-6. A light-off test was performed on fresh and aged (1050° C. for 10 hrs cycling between a 56 second rich segment and a 4 second lean segment) catalysts of the present invention. The test was performed by increasing the temperature from about 100° C. to 640° C. at R-value=1.05. The plotted temperatures in the figures were measured at the middle of the catalyst. The light-off test measures the conversions of nitrogen oxide, carbon monoxide, and hydrocarbons as a function of the catalyst system temperature. For a specific temperature, a higher conversion signifies a more efficient catalyst. Conversely, for a specific conversion, a lower temperature signifies a more efficient catalyst.

FIG. 32 shows the light-off results at R=1.05 for fresh and aged ZPGM-1 catalyst system ($Ce_{0.6}La_{0.4}Mn_{0.6}Cu_{0.4}O_3$). The light-off test for the fresh catalyst system shows that the CO and HC exhibit $T_{50}$ s at 288° C. and at 503° C., respectively. The maximum NO conversion is about 19% at 600° C. After aging, the catalyst performance decreases for CO, HC and NO. The aged catalyst shows a $T_{50}$ for CO at about 600° C. The maximum conversions for HC and NO are 19% and 2%, respectively, at 600° C.

FIG. 33 shows the light-off results at R=1.05 for fresh and aged ZPGM-2 catalyst system (8% Cu impregnated on $Al_2O_3+Ce_{0.54}Zr_{0.21}La_{0.15}O_2$ (60:40 weight ratio of $Al_2O_3$ to $Ce_{0.64}Zr_{0.21}La_{0.15}O_2$)). The light-off test for the fresh catalyst system shows that the CO and HC exhibit $T_{50}$ s at 205° C. and at 389° C., respectively. The maximum NO conversion is about 22% at 600° C. After aging, the catalyst performance decreases for CO, HC and NO. The maximum conversions for CO, HC and NO are 27%, 24% and 3%, respectively, at 600° C.

FIG. 34 shows the light-off results at R=1.05 for fresh and aged ZPGM-3 catalyst system (8% Cu+6.1% Ce+2.4% Zr+1.5% La impregnated on 15% Sn—$Al_2O_3$+ $Ce_{0.6}Zr_{0.3}Nd_{0.05}Pr_{0.05}O_2$ (60:40 weight ratio of Sn—$Al_2O_3$ to $Ce_{0.6}Zr_{0.3}Nd_{0.05}Pr_{0.05}O_2$)). The light-off test for the fresh catalyst system shows that the CO, HC and NO exhibit $T_{50}$ s at 205° C., at 389° C., and 651° C., respectively. After aging, the catalyst performance decreases for CO, HC and NO. The aged catalyst shows a $T_{50}$ for CO and HC at about 599° C. and 651° C., respectively. The maximum conversion for NO is 5% at 700° C.

FIG. 35 shows the light-off results at R=1.05 for fresh and aged ZPGM-4 catalyst system (overcoat containing 12% Cu impregnated on $Ce_{0.64}Zr_{0.21}La_{0.15}O_2+Al_2O_3$ (60:40 weight ratio of $Ce_{0.64}Zr_{0.21}La_{0.15}O_2$ to $Al_2O_3$) and a washcoat containing 8% Cu+6.1% Ce+2.4% Zr+1.5% La impregnated on 15% Sn—$Al_2O_3+Ce_{0.6}Zr_{0.3}Nd_{0.05}Pr_{0.05}O_2$ (60:40 weight ratio of Sn—$Al_2O_3$ to $Ce_{0.6}Zr_{0.3}Nd_{0.05}Pr_{0.05}O_2$)). The light-off test for the fresh catalyst system shows that the CO, HC and NO exhibit $T_{50}$ s at 254° C., at 442° C., and 636° C., respectively. After aging, the catalyst performance decreases for CO, HC and NO. The aged catalyst shows a $T_{50}$ for CO and HC at about 462° C. and 604° C., respectively. The maximum conversion for NO is about 30% at 770° C.

FIG. 36 shows the light-off results at R=1.05 for fresh and aged ZPGM-5 catalyst system (overcoat containing 12.4% CuO impregnated on La—$Al_2O_3+Ce_{0.6}Zr_{0.3}Nd_{0.05}Pr_{0.05}O_2$ (25:75 weight ratio of La—$Al_2O_3$ to $Ce_{0.6}Zr_{0.3}Nd_{0.05}Pr_{0.05}O_2$) and a washcoat containing 8% Cu+6.1% Ce+2.4% Zr+1.5% La impregnated on La—$Al_2O_3+Ce_{0.6}Zr_{0.3}Nd_{0.05}Pr_{0.05}O_2$ (60:40 weight ratio of La—$Al_2O_3$ to $Ce_{0.6}Zr_{0.3}Nd_{0.05}Pr_{0.05}O_2$)). The light-off test for the fresh catalyst system shows that the CO, HC and NO exhibit $T_{50}$ s at 262° C., at 449° C., and 608° C., respectively. After aging, the catalyst performance decreases for CO, HC and NO. The aged catalyst shows a $T_{50}$ for CO and HC at about 571° C. and 654° C., respectively. The maximum conversion for NO is about 1% at 700° C.

FIG. 37 shows the light-off results at R=1.05 for fresh and aged ZPGM-6 catalyst system (overcoat containing 10% Cu+12% Ce impregnated on $MgAl_2O_4$+16% Cu impregnated on $Ce_{0.6}Zr_{0.3}Nd_{0.05}Pr_{0.05}O_2$ (60:40 weight ratio of Ce impregnated on $MgAl_2O_4$ to 16% Cu impregnated on $Ce_{0.6}Zr_{0.3}Nd_{0.05}Pr_{0.05}O_2$) (65 g/L) and a washcoat containing 4% Cu+6.1% Ce+2.4% Zr+1.5% La impregnated on $MgAl_2O_4+Ce_{0.64}Zr_{0.21}La_{0.15}O_2$ (60:40 weight ratio of $MgAl_2O_4$ to $Ce_{0.64}Zr_{0.21}La_{0.15}O_2$)). The light-off test for the fresh catalyst system shows that the CO, HC and NO exhibit $T_{50}$ s at 262° C., at 463° C., and 622° C., respectively. After aging, the catalyst performance decreases for CO, HC and NO. The aged catalyst shows a $T_{50}$ for CO and HC at about 425° C. and 613° C., respectively. The maximum conversion for NO is about 23% at 730° C.

Although the present invention has been described in terms of specific embodiments, changes and modifications can be made without departing from the scope of the invention which is intended to be defined only by the scope of the claims. All references cited herein are hereby incorporated by reference in their entirety, including any references cited therein.

What is claimed is:

1. A method of simultaneously reducing NOx, CO and hydrocarbons emitted in exhaust from a non-diesel engine comprising passing the exhaust through a three-way catalyst system for a fuel-rich exhaust, wherein the three-way catalyst system is substantially free of platinum group metals, and comprises:
   a substrate;
   a washcoat,
      wherein the washcoat comprises
         a catalyst comprising copper oxide with a carrier material oxide or a catalyst comprising a mixture of copper oxide and one or more catalysts with a carrier material oxide,
   wherein the catalyst system simultaneously reduces NOx, CO and hydrocarbons on contact with said exhaust.

2. A method of simultaneously reducing NOx, CO and hydrocarbons emitted in exhaust from a non-diesel engine, comprising passing the exhaust through a three-way catalyst system, wherein the three-way catalyst system is substantially free of platinum group metals, and comprises:
   a substrate;
   a washcoat, wherein the washcoat comprises one or more selected from the group consisting of a carrier material oxide, ceramic, and mixtures thereof; and
an overcoat,
wherein the overcoat comprises a catalyst, selected from the group consisting of a ZPGM transition metal catalyst, a mixed metal oxide catalyst, a zeolite catalyst, and a mixture thereof, and
wherein the catalyst comprises copper oxide and at least one carrier material oxide,
wherein the catalyst system simultaneously reduces NOx, CO and hydrocarbons on contact with said exhaust.

3. The method of claim 2 wherein the catalyst system further comprises one or more selected from the group consisting of a perovskite, a spinel, an oxygen storage material, alumina, and mixtures thereof.

4. The method of claim 2 wherein the catalyst in the overcoat is about 5% to about 50% by weight.

5. A method of simultaneously reducing NOx, CO and hydrocarbons emitted in exhaust from a non-diesel engine comprising passing the exhaust through a three-way catalyst system, wherein the three-way catalyst system is substantially free of platinum group metals, and comprises
a substrate,
wherein the substrate comprises cordierite;
a washcoat,
wherein the washcoat comprises copper, a spinel, and at least one oxygen storage material,
wherein the spinel comprises magnesium aluminum oxide,
wherein the oxygen storage material comprises one or more selected from the group consisting of cerium, zirconium, and lanthanum; and
an overcoat,
wherein the overcoat comprises copper oxide, a spinel, and at least one oxygen storage material,
wherein the spinel comprises magnesium aluminum oxide,
wherein the oxygen storage material comprises one or more selected from the group consisting of cerium, zirconium, neodymium, and praseodymium,
wherein the catalyst system simultaneously reduces NOx, CO and hydrocarbons on contact with said exhaust.

6. A method of simultaneously reducing NOx, CO and hydrocarbons emitted in exhaust from a non-diesel engine comprising passing the exhaust through a three-way catalyst system, wherein the three-way catalyst system is substantially free of platinum group metals, and comprises
a substrate: and
a washcoat,
wherein the washcoat comprises copper oxide, tin aluminum oxide, and at least one oxygen storage material,
wherein the catalyst system simultaneously reduces NOx, CO and hydrocarbons on contact with said exhaust.

7. A method of simultaneously reducing NOx, CO and hydrocarbons emitted in exhaust from a non-diesel engine comprising passing the exhaust through a three-way catalyst system, wherein the three-way catalyst system is substantially free of platinum group metals, and comprises
a substrate; and
a washcoat,
wherein the washcoat comprises aluminum oxide, copper oxide, and at least one oxygen storage material,
wherein the oxygen storage material comprises a mixture of cerium, zirconium, and lanthanum,
wherein the catalyst system simultaneously reduces NOx, CO and hydrocarbons on contact with said exhaust.

* * * * *